United States Patent
Ukishima

(10) Patent No.: US 9,596,384 B2
(45) Date of Patent: Mar. 14, 2017

(54) SIGNAL CONVERSION METHOD AND APPARATUS, PROGRAM, AND PRINT SYSTEM

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/837,069

(22) Filed: Aug. 27, 2015

(65) Prior Publication Data

US 2015/0373228 A1    Dec. 24, 2015

Related U.S. Application Data

(63) Continuation of application No. PCT/JP2014/056265, filed on Mar. 11, 2014.

(30) Foreign Application Priority Data

Mar. 29, 2013  (JP) ................................. 2013-073105

(51) Int. Cl.
  *G06F 3/08* (2006.01)
  *H04N 1/60* (2006.01)
  (Continued)

(52) U.S. Cl.
  CPC ......... *H04N 1/6022* (2013.01); *G06F 3/1219* (2013.01); *G06F 3/1254* (2013.01);
  (Continued)

(58) Field of Classification Search
  None
  See application file for complete search history.

(56) References Cited

U.S. PATENT DOCUMENTS 5,268,754 A * 12/1993 Van de Capelle ........ G01J 3/46
  358/500
6,088,475 A *  7/2000 Nagashima ........... G06T 11/001
  358/518

(Continued)

FOREIGN PATENT DOCUMENTS

JP   2005-101934 A   4/2005

OTHER PUBLICATIONS

International Search Report for PCT/JP2014/056265 dated Jun. 3, 2014.
Written Opinion for PCT/JP2014/056265 dated Jun. 3, 2014.

*Primary Examiner* — Madelein Nguyen
(74) *Attorney, Agent, or Firm* — Studebaker & Brackett PC

(57) ABSTRACT

Provided are a signal conversion method and apparatus, a recording medium storing non-transitory program, and a print system which can prevent a color reproduction gamut from being excessively narrowed while avoiding a print failure caused by excess color material. A signal conversion method for limiting the total amount of color materials used in a printing device that forms an image on a recording medium using a plurality of color materials includes determining a final output vector after the total amount of color materials used is limited for an input vector, on the basis of a plurality of input/output signal conversion processes based on different limit values of the total amount of color materials used and weight definition information in which weights applied to the conversion results of the plurality of input/output signal conversion processes are determined according to the input vector.

18 Claims, 11 Drawing Sheets

(51) Int. Cl.
*G06K 9/00* (2006.01)
*G06F 3/12* (2006.01)
*G06K 15/10* (2006.01)
*G06K 15/14* (2006.01)
*G06K 15/02* (2006.01)
*G06K 15/00* (2006.01)

(52) U.S. Cl.
CPC ........... *G06K 15/102* (2013.01); *G06K 15/14* (2013.01); *G06K 15/1823* (2013.01); *G06K 15/1878* (2013.01); *G06K 15/407* (2013.01); *H04N 1/60* (2013.01)

(56) References Cited

U.S. PATENT DOCUMENTS

| | | | | |
|---|---|---|---|---|
| 6,278,533 B1* | 8/2001 | Takemoto | | H04N 1/6022 358/521 |
| 6,294,592 B1* | 9/2001 | Herrmann | | B41M 5/0023 106/31.6 |
| 6,724,507 B1* | 4/2004 | Ikegami | | H04N 1/6058 358/501 |
| 7,027,182 B1* | 4/2006 | Soler | | H04N 1/6033 347/19 |
| 7,030,917 B2* | 4/2006 | Taubman | | H04N 9/045 348/273 |
| 7,236,195 B2* | 6/2007 | Quan | | H04N 1/48 348/207.99 |
| 7,345,787 B2* | 3/2008 | Ito | | H04N 1/6058 345/589 |
| 7,982,911 B2* | 7/2011 | Hasegawa | | H04N 1/603 358/1.9 |
| 8,054,504 B2* | 11/2011 | Mahy | | H04N 1/54 358/1.9 |
| 8,144,366 B2* | 3/2012 | Tin | | H04N 1/6019 358/3.23 |
| 8,335,017 B1* | 12/2012 | Gil | | H04N 1/622 358/1.9 |
| 8,335,019 B2* | 12/2012 | Aihara | | H04N 1/6019 358/3.23 |
| 8,385,971 B2* | 2/2013 | Rhoads | | G06F 17/30244 382/162 |
| 2002/0113982 A1* | 8/2002 | Chang | | G06K 15/02 358/1.9 |
| 2003/0169438 A1* | 9/2003 | Velde | | H04N 1/6022 358/1.9 |
| 2005/0206929 A1* | 9/2005 | Tsuji | | H04N 1/6022 358/1.9 |
| 2007/0223810 A1* | 9/2007 | Sekine | | H04N 1/46 382/162 |
| 2007/0279659 A1* | 12/2007 | Hasegawa | | H04N 1/6058 358/1.9 |
| 2010/0157372 A1* | 6/2010 | Qiao | | H04N 1/6058 358/3.01 |
| 2010/0157393 A1* | 6/2010 | Qiao | | H04N 1/6058 358/500 |
| 2010/0157397 A1* | 6/2010 | Qiao | | H04N 1/6058 358/518 |
| 2010/0158359 A1* | 6/2010 | Qiao | | G06K 9/4652 382/164 |
| 2011/0051207 A1* | 3/2011 | Dalrymple | | H04N 1/6058 358/518 |
| 2011/0229641 A1* | 9/2011 | Yasuda | | C09D 11/101 427/288 |
| 2012/0113186 A1* | 5/2012 | Fukui | | B05C 1/0813 347/20 |
| 2012/0224012 A1* | 9/2012 | Inoue | | B41F 21/00 347/104 |
| 2013/0162714 A1* | 6/2013 | Kobayashi | | B41M 5/00 347/17 |
| 2013/0222479 A1* | 8/2013 | Houjou | | B41J 2/2146 347/40 |
| 2014/0063159 A1* | 3/2014 | Houjou | | B41J 11/002 347/102 |
| 2014/0063160 A1* | 3/2014 | Houjou | | B41J 11/0015 347/102 |
| 2015/0119487 A1* | 4/2015 | Vanbesien | | C09D 11/023 522/18 |
| 2015/0158315 A1* | 6/2015 | Furukawa | | B65H 5/36 347/16 |
| 2015/0246556 A1* | 9/2015 | Houjou | | B41J 11/002 347/16 |

\* cited by examiner

FIG. 1

LIMIT VALUE OF TOTAL AMOUNT OF COLOR MATERIALS USED : 220

| INPUT VECTOR [%] | | | | OUTPUT VECTOR [%] | | | | |
|---|---|---|---|---|---|---|---|---|
| C | M | Y | K | C | M | Y | K | |
| 0 | 0 | 0 | 0 | 0 | 0 | 0 | 0 | |
| 10 | 0 | 0 | 0 | 10 | 0 | 0 | 0 | |
| 20 | 0 | 0 | 0 | 20 | 0 | 0 | 0 | |
| ⋮ | ⋮ | ⋮ | ⋮ | ⋮ | ⋮ | ⋮ | ⋮ | |
| 100 | 100 | 0 | 0 | 100 | 100 | 0 | 0 | ←—1A |
| ⋮ | ⋮ | ⋮ | ⋮ | ⋮ | ⋮ | ⋮ | ⋮ | |
| 100 | 100 | 0 | 20 | 100 | 100 | 0 | 20 | ←—1B |
| ⋮ | ⋮ | ⋮ | ⋮ | ⋮ | ⋮ | ⋮ | ⋮ | |
| 100 | 100 | 100 | 80 | 34 | 33 | 33 | 100 | |
| 100 | 100 | 100 | 90 | 37 | 37 | 36 | 100 | |
| 100 | 100 | 100 | 100 | 40 | 40 | 40 | 100 | ←—1C |

FIG. 2

LIMIT VALUE OF TOTAL AMOUNT OF COLOR MATERIALS USED : 180

| INPUT VECTOR [%] | | | | OUTPUT VECTOR [%] | | | | |
|---|---|---|---|---|---|---|---|---|
| C | M | Y | K | C | M | Y | K | |
| 0 | 0 | 0 | 0 | 0 | 0 | 0 | 0 | |
| 10 | 0 | 0 | 0 | 10 | 0 | 0 | 0 | |
| 20 | 0 | 0 | 0 | 20 | 0 | 0 | 0 | |
| ⋮ | ⋮ | ⋮ | ⋮ | ⋮ | ⋮ | ⋮ | ⋮ | |
| 100 | 100 | 0 | 0 | 90 | 90 | 0 | 0 | ← 2A |
| ⋮ | ⋮ | ⋮ | ⋮ | ⋮ | ⋮ | ⋮ | ⋮ | |
| 100 | 100 | 0 | 20 | 80 | 80 | 0 | 20 | ← 2B |
| ⋮ | ⋮ | ⋮ | ⋮ | ⋮ | ⋮ | ⋮ | ⋮ | |
| 100 | 100 | 100 | 80 | 20 | 20 | 20 | 100 | |
| 100 | 100 | 100 | 90 | 24 | 23 | 23 | 100 | |
| 100 | 100 | 100 | 100 | 27 | 27 | 26 | 100 | ← 2C |

FIG. 4

| INPUT VECTOR [%] | | | | WEIGHT | |
|---|---|---|---|---|---|
| C | M | Y | K | 220 | 180 |
| 0 | 0 | 0 | 0 | 1.0 | 0.0 |
| 100 | 0 | 0 | 0 | 1.0 | 0.0 |
| 0 | 100 | 0 | 0 | 1.0 | 0.0 |
| 0 | 0 | 100 | 0 | 1.0 | 0.0 |
| 0 | 100 | 100 | 0 | 1.0 | 0.0 |
| 100 | 0 | 100 | 0 | 1.0 | 0.0 |
| 100 | 100 | 0 | 0 | 1.0 | 0.0 |
| 100 | 100 | 100 | 0 | 0.5 | 0.5 |
| ⋮ | ⋮ | ⋮ | ⋮ | ⋮ | ⋮ |
| 0 | 0 | 0 | 100 | 1.0 | 0.0 |
| 100 | 0 | 0 | 100 | 1.0 | 0.0 |
| 0 | 100 | 0 | 100 | 1.0 | 0.0 |
| 0 | 0 | 100 | 100 | 1.0 | 0.0 |
| 0 | 100 | 100 | 100 | 0.5 | 0.5 |
| 100 | 0 | 100 | 100 | 0.5 | 0.5 |
| 100 | 100 | 0 | 100 | 0.5 | 0.5 |
| 100 | 100 | 100 | 100 | 0.0 | 1.0 |

LIMIT VALUE OF TOTAL AMOUNT OF COLOR MATERIALS USED : 200

| INPUT VECTOR [%] | | | | OUTPUT VECTOR [%] | | | |
|---|---|---|---|---|---|---|---|
| C | M | Y | K | C | M | Y | K |
| 0 | 0 | 0 | 0 | 0 | 0 | 0 | 0 |
| 0 | 0 | 0 | 10 | 0 | 0 | 0 | 10 |
| 0 | 0 | 0 | 20 | 0 | 0 | 0 | 20 |
| ⋮ | | | | ⋮ | | | |
| 100 | 100 | 0 | 20 | 90 | 90 | 0 | 20 |
| ⋮ | | | | ⋮ | | | |
| 100 | 100 | 0 | 50 | 75 | 75 | 0 | 50 |
| ⋮ | | | | ⋮ | | | |
| 100 | 100 | 100 | 80 | 27 | 27 | 26 | 100 |
| 100 | 100 | 100 | 90 | 30 | 30 | 30 | 100 |
| 100 | 100 | 100 | 100 | 34 | 33 | 33 | 100 |

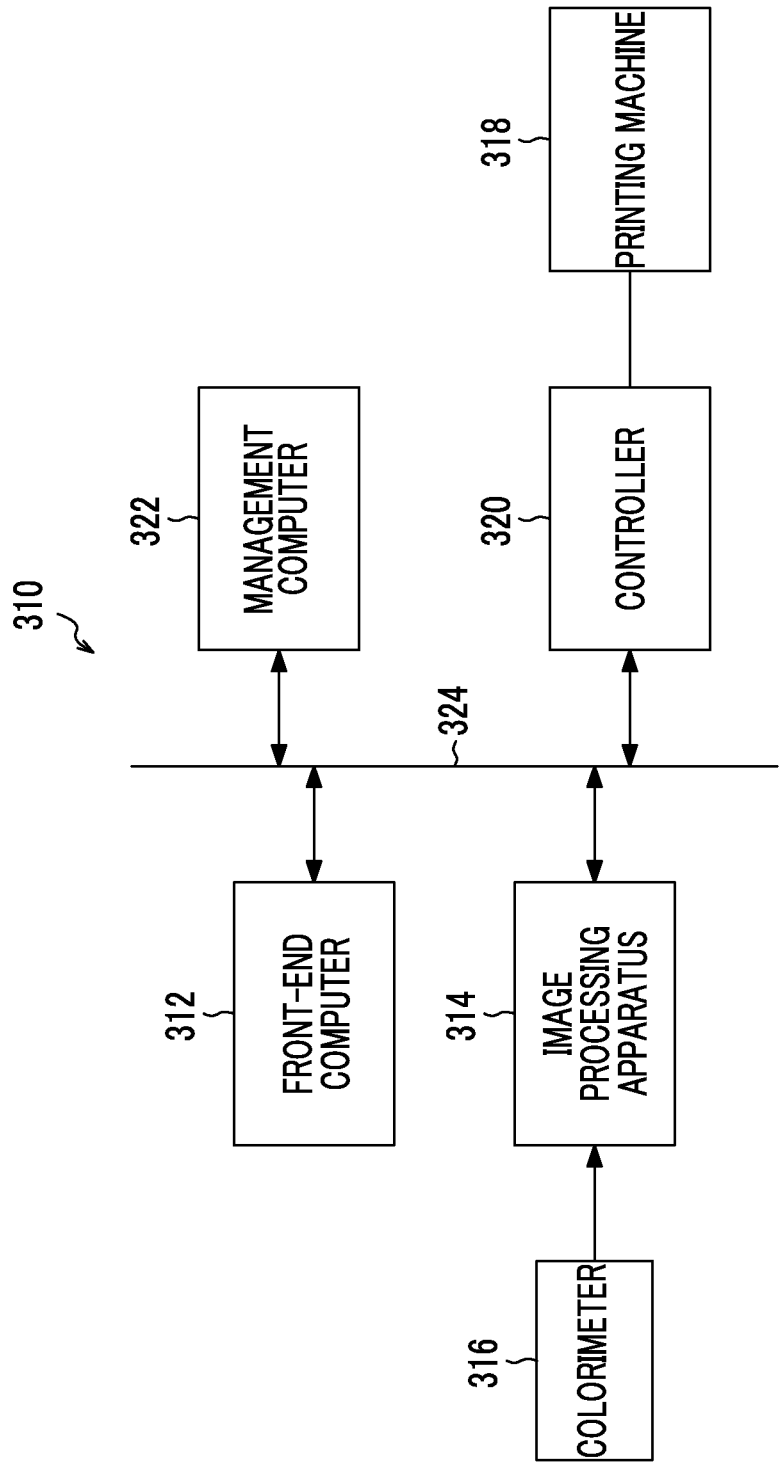

SIGNAL CONVERSION METHOD AND APPARATUS, PROGRAM, AND PRINT SYSTEM

CROSS REFERENCE TO RELATED APPLICATIONS

This application is a Continuation of PCT International Application No. PCT/JP2014/056265 filed on Mar. 11, 2014, which claims priority under 35 U.S.C §119(a) to Japanese Patent Application No. 2013-073105 filed on Mar. 29, 2013, all of which are hereby expressly incorporated by reference into the present application.

BACKGROUND OF THE INVENTION

1. Field of the Invention

The present invention relates to a signal conversion method and apparatus, a recording medium, and a print system, and more particularly, to a signal conversion technique for limiting the amount of color material used in a print system that forms an image on a recording medium using color materials.

2. Description of the Related Art

A printing apparatus (printing device), such as an ink jet printer or an electrophotographic printer, applies a color material (recording agent), such as ink or toner, onto a recording medium, such as a sheet, to form a desired image on the recording medium.

JP2005-101934A discloses a technique which performs an under-color removal process of replacing a predetermined amount of CMY signal, which is an input CMYK signal, with a K signal in order to prevent excess color material from being applied and to improve the reproducibility of an output image while limiting the amount of toner or ink attached to a unit area (paragraph 0005 in JP2005-101934A).

That is, JP2005-101934A discloses "an image processing apparatus that supplies an image signal to an image formation apparatus for forming an image on a recording medium using a recording agent and includes: a storage unit that stores the limit value of the total sum of the levels of image signals output to the image formation apparatus; input means for inputting CMYK signals as the image signals; first comparison means for comparing the total sum of the levels of the input CMYK signals with the limit value; under-color removal means for performing an under-color removal process of replacing a predetermined amount of CMY signals with a K signal when the total sum of the levels of the input CMYK signals is greater than the limit value; second comparison means for comparing the total sum of the levels of the CMYK signals subjected to the under-color removal process with the limit value; and an adjustment unit that reduces CMY signals after the under-color removal process by the same proportions such that the total sum after the under-color removal process is equal to or less than the limit value when the total sum after the under-color removal process is greater than the limit value" (claim 1 of JP2005-101934A).

SUMMARY OF THE INVENTION

As described above, the technique disclosed in JP2005-101934A is characterized in that signal conversion is performed such that the total sum of the levels (values corresponding to the amounts of color materials used) of the image signals does not exceed the limit value (a value corresponding to the limit value of the total amount of color materials used). In this case, in JP2005-101934A, a single limit value is set. Therefore, a CMYK signal after signal conversion for a given input signal is certainly within the single limit value. A common reason for setting the limit value is that, when a large amount of color materials is used, the recording medium does not absorb the color materials which are applied so as to overlap each other and accurate-patch color reproduction cannot be performed, film characteristics deteriorate due to excess color material, or a sheet becomes curved due to excess color material to cause a medium transportation problem. In the specification, this phenomenon is referred to as a "print failure caused by excess color material".

The upper limit of the total amount of color materials used can be set to a small value to suppress a print failure caused by excess color material. On the other hand, in general, as the limit of the total amount of color materials used becomes stricter (the limit value of the total amount of color materials used is small), the color reproduction gamut which can be expressed in printed matter becomes narrower. Therefore, it is preferable to maximize the limit value of the total amount of color materials used in the range in which the "print failure caused by excess color material" does not occur.

In the technique disclosed in JP2005-101934A, a single limit value is used. However, in some cases, the total amount of color materials used where the "print failure caused by excess color material" occurs varies depending on a combination of the amounts of color materials used, according to print systems. For example, when the unit of the amount of color material used is a percentage, the total amount of color materials used is "220" both in the case of (C, M, Y, K)=(40, 40, 40, 100) and in the case of (C, M, Y, K)=(100, 100, 0, 20). In some cases, the "print failure caused by excess color material" occurs in the former case and does not occur in the latter case. In practice, the inventors' experiments proved that this phenomenon was remarkable in a print system using an aqueous ultraviolet (UV) curable ink.

When the technique disclosed in JP2005-101934A is applied to a print system, the limit value of the total amount of color materials used needs to be set to a value that is less than at least "220". However, when the limit value is reduced, the color reproduction gamut is excessively narrowed in a combination of the amounts of color materials used where a "print failure caused by excess color material" is less likely to occur. It can be considered that this problem is not limited to a print system using an aqueous ultraviolet curable ink, but is common to various types of print system.

The invention has been made in view of the above-mentioned problems and an object of the invention is to provide a signal conversion method and apparatus, a recording medium, and a print system which can solve the above-mentioned problems and prevent a color reproduction gamut from being excessively narrowed while avoiding a print failure caused by excess color material.

In order to solve the above-mentioned problems, the following invention is provided.

(First Aspect): According to a first aspect, there is provided a signal conversion method for converting an image signal in order to limit a total amount of color materials used in a printing device that forms an image on a recording medium using a plurality of color materials. The signal conversion method includes preparing a plurality of input/output signal conversion processes based on different limit values such that a plurality of results of conversion from an input vector to a vector in which the total amount of color materials used is limited to a value equal to or less than the limit value are generated, and determining a final output vector after the total amount of color materials used is limited for the input vector, on the basis of the plurality of input/output signal conversion processes and weight definition information in which weights applied to the conversion results of the plurality of input/output signal conversion processes are determined according to the input vector.

According to the first aspect, the final output vector is obtained from the input vector by a combination of the plurality of (two or more types of) input/output signal conversion processes with different limit values of the total amount of color materials used and the weight which is determined from the weight definition information according to the color indicated by the input vector. The weight determined from the weight definition information indicates the contribution ratio of each input/output signal conversion process and changes the limit value of the total amount of color materials used depending on colors. According to the signal conversion method of the first aspect, it is possible to perform the signal conversion processes in which the limit value of the total amount of color materials used varies depending on colors and to appropriately change the limit value depending on an input vector. Therefore, it is possible to prevent the color reproduction gamut from being excessively narrowed while avoiding a print failure caused by excess color material.

(Second Aspect): The signal conversion method according to the first aspect may further include a step of applying the plurality of input/output signal conversion processes to the input vector to generate a plurality of output vectors for each limit value in which the total amount of color materials used is limited to a value that is equal to or less than each limit value and a step of calculating a weighted sum of the plurality of output vectors for each limit value, using the weights determined from the weight definition information, and determining the output vectors.

The plurality of input/output signal conversion processes with different limit values of the total amount of color materials used are applied to the input vector and the output vectors for each limit value are obtained from the input/output signal conversion processes. Weights can be given to the output vectors for each limit value to calculate a vector sum and the calculated vector sum can be used as the final output vector.

(Third Aspect): In the signal conversion method according to the first aspect or the second aspect, cyan (C), magenta (M), yellow (Y), and black (K) color materials may be used as the plurality of color materials.

(Fourth Aspect): In the signal conversion method according to the third aspect, the input/output signal conversion process may generate a CMYK four-dimensional output vector for each limit value from a CMYK four-dimensional input vector.

The input vector can be defined in various vector spaces. For example, a CMYK four-dimensional vector can be used as the input vector. In this case, four dimension-to-four dimension conversion (4-4 conversion) which obtains output C, M, Y, and K from input C, M, Y, and K is performed.

(Fifth Aspect): In the signal conversion method according to the third aspect, the input/output signal conversion process may generate a CMYK four-dimensional output vector for each limit value from an RGB three-dimensional input vector which is described by red (R), green (G), and blue (B) color components.

An RGB three-dimensional space can be used as an input vector space. In this case, three dimension-to-four dimension conversion (3-4 conversion) which obtains output C, M, Y, and K from input R, G, and B is performed.

(Sixth Aspect): In the signal conversion method according to any one of the third to fifth aspects, when only two types of C and M, M and Y, or Y and C color materials among C, M, Y, and K are fully used to express a secondary color, the total amount of color materials used may be more than the total amount of color materials used when all of four types of C, M, Y, and K color materials are fully used to express a quaternary color.

The sixth aspect is suitable for a print system having the characteristics that a print failure caused by excess color material is likely to occur when a K color material is used. According to the sixth aspect, when only two types of color materials (a combination of C and M, M and Y, or Y and C) other than K are used, the upper limit of the amount of color materials used is less than the upper limit of the amount of color materials used when all of four types of C, M, Y, and K color materials are used. Therefore, the color reproduction gamut is wider than that in the structure in which the total amount of color materials used is limited to a single limit value for avoiding a print failure caused by excess color material when a K color material is used.

(Seventh Aspect): In the signal conversion method according to any one of the first to sixth aspects, in a vector space in which the input/output signal conversion process is performed, any one of a signal value, a percentage, an area ratio, and a physical amount of a color material may be used as a value indicating the amount of color material used.

(Eighth Aspect): In the signal conversion method according to any one of the first to seventh aspects, the input/output signal conversion process may be performed by calculation using a calculation formula.

As means for implementing a conversion process of converting an input vector into a vector in which the total amount of color materials used is limited, a structure can be used in which calculation is performed for the input vector using a calculation formula for determining a conversion relationship.

(Ninth Aspect): In the signal conversion method according to any one of the first to eighth aspects, the input/output signal conversion process may be performed using a look-up table (LUT).

As means for implementing a conversion process of converting an input vector into a vector in which the total amount of color materials used is limited, a structure can be used in which an LUT determining the conversion relationship is used and a converted vector is calculated from the input vector with reference to the LUT.

(Tenth Aspect): In the signal conversion method according to the ninth aspect, the input/output signal conversion process may include a step of performing an interpolation process using data defined by the look-up table (LUT).

According to the tenth aspect, discrete data defined by the look-up table can be calculated by the interpolation process. Therefore, it is possible to reduce the amount of data in the LUT, as compared to the case in which outputs for all of the input vectors are defined by the LUT. As a result, it is possible to reduce the storage space of the LUT.

(Eleventh Aspect): The signal conversion method according to any one of the first to tenth aspects may further include a step of performing the interpolation process using data defined by the weight definition information to determine the value of the weight.

According to the eleventh aspect, discrete data defined by the weight definition information can be calculated by the interpolation process. Therefore, it is possible to reduce the amount of data in the weight definition information, as compared to the case in which information about the weights of all of the input vectors is defined as the weight definition information. As a result, it is possible to reduce the storage space of the weight definition information.

(Twelfth Aspect): In the signal conversion method according to any one of the first to eleventh aspects, the printing device may be any one of an ink jet printer, an electrophotographic printer, and an offset printing machine.

In the invention, the form (for example, the type or printing method) of the printing device is not limited to that described in the twelfth aspect.

(Thirteenth Aspect): In the signal conversion method according to any one of the first to twelfth aspects, the color material may be ink or toner.

The color material is appropriately used according to the type of printing device used.

(Fourteenth Aspect): According to a fourteenth aspect, there is provided a signal conversion apparatus that converts an image signal in order to limit a total amount of color materials used in a printing device which forms an image on a recording medium using a plurality of color materials. The signal conversion apparatus includes a plurality of input/output signal conversion processing units that perform an input/output conversion process on the basis of different limit values such that a plurality of results of conversion from an input vector to a vector in which the total amount of color materials used is limited to a value equal to or less than the limit value are generated. A final output vector after the total amount of color materials used is limited for the input vector is determined, on the basis of the plurality of input/output signal conversion processing units and weight definition information in which weights applied to the conversion results of the plurality of input/output signal conversion processing units are determined according to the input vector.

In the signal conversion apparatus according to the fourteenth aspect, the same matters as those in the second to thirteenth aspects can be appropriately combined with each other. In this case, the matters which are specified as "steps" in the method are understood as means corresponding to the matters or functional units for implementing the functions of the means.

(Fifteenth Aspect): In the signal conversion apparatus according to the fourteenth aspect, the plurality of input/output signal conversion processing units may generate a plurality of output vectors for each limit value in which the total amount of color materials used is limited to a value that is equal to or less than each limit value. The signal conversion apparatus may further include a weight definition information storage unit that stores the weight definition information and a weighted sum calculation unit that calculates a weighted sum of the plurality of output vectors for each limit value, on the basis of the plurality of output vectors for each limit value and the weight definition information.

(Sixteenth Aspect): In the signal conversion apparatus according to the fourteenth aspect or the fifteenth aspect, the input/output signal conversion processing unit may include an interpolation unit that performs an interpolation process using data defined by a look-up table.

(Seventeenth Aspect): The signal conversion apparatus according to any one of the fourteenth to sixteenth aspects may further include a weight determination unit that performs the interpolation process using data defined by the weight definition information to determine the value of the weight.

(Eighteenth Aspect): According to an eighteenth aspect, a print system includes the signal conversion apparatus according to any one of the fourteenth to seventeenth aspects and a printing device that forms an image on a recording medium on the basis of an output vector generated by the signal conversion apparatus.

In the print system according to the eighteenth aspect, the same matters as those in the second to thirteenth aspects can be appropriately combined with each other. In this case, the matters which are specified as "steps" in the method are understood as means corresponding to the matters or functional units for implementing the functions of the means.

(Nineteenth Aspect): In the print system according to the eighteenth aspect, the printing device may use an aqueous ultraviolet curable ink as the color material.

(Twentieth Aspect): According to a twentieth aspect, there is provided a recording medium storing non-transitory program that causes a computer to implement a signal conversion function that converts an image signal in order to limit a total amount of color materials used in a printing device which forms an image on a recording medium using a plurality of color materials, a plurality of input/output signal conversion processing functions that perform an input/output signal conversion process on the basis of different limit values such that a plurality of results of conversion from an input vector to a vector in which the total amount of color materials used is limited to a value equal to or less than the limit value are generated, and a function that determines a final output vector after the total amount of color materials used is limited for the input vector, on the basis of the plurality of input/output signal conversion processing functions and weight definition information in which weights applied to the conversion results of the plurality of input/output signal conversion processing units are determined according to the input vector.

In the recording medium storing non-transitory program according to the twentieth aspect, the same matters as those in the second to thirteenth aspects can be appropriately combined with each other. In this case, the matters which are specified as "steps" in the method are understood as means corresponding to the matters or recording medium storing non-transitory program elements for implementing the functions of the means.

(Twenty-first Aspect): In the recording medium storing non-transitory program according to the twentieth aspect, the recording medium storing non-transitory program may cause the computer to further implement a function that applies the plurality of input/output signal conversion processing functions to the input vector to generate a plurality of output vectors for each limit value in which the total amount of color materials used is limited to a value that is equal to or less than each limit value from each input/output signal conversion process and a weighted sum calculation function that calculates a weighted sum of the plurality of output vectors for each limit value, on the basis of the weight definition information.

According to the invention, it is possible to avoid a print failure caused by excess color material and to appropriately limit the total amount of color materials used according to colors. Therefore, it is possible to prevent a color reproduction gamut from being excessively narrowed.

BRIEF DESCRIPTION OF THE DRAWINGS

FIG. 1 is a table illustrating an example of a look-up table (LUT) which is applied to a color material usage conversion process.

FIG. 2 is a table illustrating another example of the look-up table (LUT) which is applied to the color material usage conversion process.

FIG. 4 is a table illustrating an example of weight definition information.

FIG. 6 is a table illustrating another example of the look-up table (LUT) which is applied to the color material usage conversion process.

FIG. 11 is a block diagram illustrating an example of the structure of a print system according to another embodiment of the invention.

DESCRIPTION OF THE PREFERRED EMBODIMENTS

Figure 3:
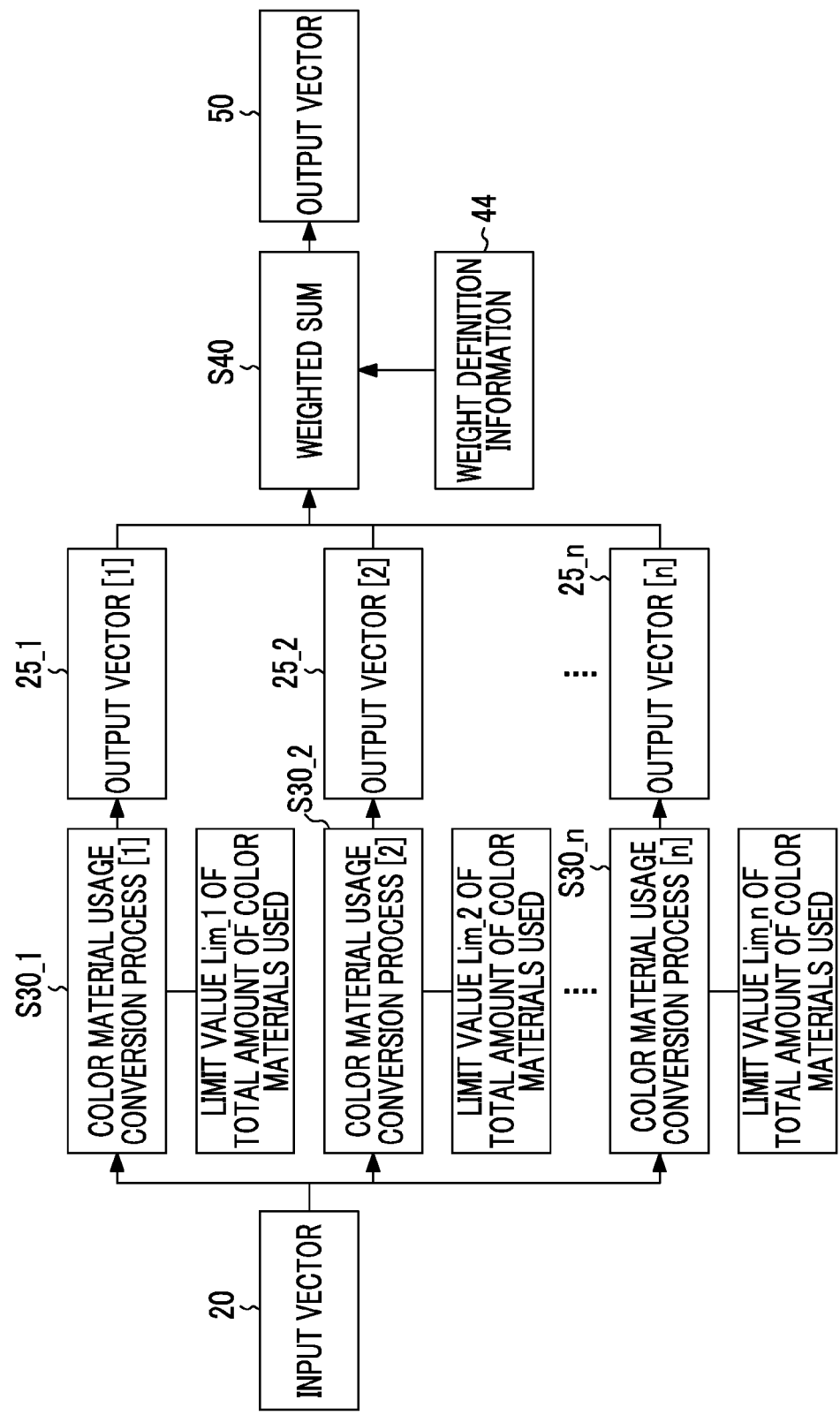
FIG. 3 is a diagram illustrating the outline of a signal conversion method according to an embodiment of the invention.

Hereinafter, embodiments of the invention will be described in detail with reference to the accompanying drawings.

<1. Definition of Terms and Symbols>

First, the definition of terminology (terms and symbols) used in this embodiment will be described.

(1-1) For "Color Material"

This embodiment is applied to a print system which uses four types of color material, such as cyan (C), magenta (M), yellow (Y), and black (K). However, the type of print system is not limited thereto. The invention may be applied to any type of print system or any printing method as long as the print system or the printing method uses a plurality of (two or more types of) color materials. The print system includes, for example, an offset printing machine, an electrophotographic printer, and an ink jet printer. The color material may be ink or toner according to the type of print system.

In addition, the invention is not limited to the structure using four types of color materials, such as C, M, Y, and K. Various types of color materials or combinations thereof may be used. For example, the invention can also be applied to a structure using only two colors, that is, C and M, a structure using three colors, that is, C, M, and Y, and a structure using five or more colors, that is, C, M, Y, K, light colors, such as light cyan and light magenta, and special colors.

(1-2) For "Amount of Color Material Used"

In this embodiment, "the amount of color material used" means the amount of each color material used. The amount of color material used can be defined in various ways. For example, the amount of color material used can be defined as follows.

<1-2-1> Signal Value

A signal value which is used in the print system can be used as a value indicating the amount of color material used.

For example, when an image in which one color is represented by 8 bits is treated, the signal value is a value of [0 to 255] which is defined in the range of 0 to 255. When an image in which one color is represented by 12 bits is treated, the image signal is a value in the range of 0 to 4095.

<1-2-2> Percentage

A "percentage" can be used as the value indicating the amount of color material used. It is assumed that the percentage is 0 when no color material is used and is 100 when the maximum amount of color material is used. When the signal value is an 8-bit integer (0 to 255), a signal value of "0" indicates 0%, a signal value of "255" indicates 100%, and a value between 0% and 100% can be indicated by a linear expression. When the input value of an 8-bit signal is i, a percentage $a_i$ is represented by the following Expression (1):

$$a_i = 100 \times \frac{i}{255} \qquad \text{[Expression (1)]}$$

<1-2-3> Area Ratio

An "area ratio" can be used as the value indicating the amount of color material used. In the field of printing, in some cases, the area ratio is used as a unit indicating the amount of color material used. For the area ratio, the amount of color material applied to a unit region is represented by "coverage". The area ratio is defined in various ways. However, for example, an area ratio which is represented by a Murray-Davies equation (known) or an area ratio which is represented by a Yule-Nielsen equation (known) is used as a method for theoretically calculating the coverage.

<1-2-4> Physical Amount of Color Material

A "physical amount of the color material" can be used as the value indicating the amount of color material used. The physical amount of the color material means a physical amount which corresponds to the amount of color material. For example, the physical amount of the color material can be represented by the volume of the color material. In an ink jet printer which is an example of the printing device, the volume of one droplet discharged from a nozzle is measured by an appropriate method in advance and the volume of ink can be calculated from the number of droplets discharged to a given area with respect to a usage rate input to the printer.

As a method for measuring the volume of one droplet, for example, the following methods can be used: a method which measures the mass of a plurality of droplets and calculates the average volume of one droplet from the density of ink; a method which discharges ink to, for example, an impermeable medium (resin sheet) and calculates the volume from a relation with respect to a landing diameter or a contact angle; and a method which captures the ejection shape of a liquid droplet from a nozzle using a camera and performs image analysis to calculate the volume.

<1-2-5> Amount of Color Material Used which is Used in Description of this Embodiment For simplicity of description of this embodiment, it is assumed that a "percentage" is used as "the amount of color material used". However, as described above, the invention can be applied to various definitions of the amount of color material used.

(1-3) For "Total Amount of Color Materials Used"

The total amount of color materials used means the sum of the amounts of each color material (C, M, Y, and K) used. The total amount of color materials used is represented by a value indicating the sum of the amounts of four color materials used in a unit area (for example, one pixel or a predetermined number of pixels). One pixel region can be specified from the recording resolution of the print system (image forming apparatus).

(1-4) For "Limit Value of Total Amount of Color Materials Used"

The limit value of the total amount of color materials used is specified as the upper limit of the total amount of color materials used which is the sum of the amounts of color materials used in a unit area. For example, when the amount of each of C, M, Y, and K color materials used is 100%, the total amount of color materials used in a recording medium is 400%. As such, when a large amount of four color materials is used, the recording medium is not capable of absorbing the color materials which are applied so as to be superimposed and a print failure is likely to occur due to excess color material. Therefore, a structure which sets the limit value of the total amount of color materials used which is defined as "the upper limit of the total amount of color materials used" and prevents the total amount of color materials used from exceeding the limit value during printing is introduced into the print system. In this case, it is possible to stably perform printing.

In the embodiment of the invention, a plurality of color material usage conversion processes (input/output conversion processes) having different limit values of the total amount of color materials used are introduced and the limit value of the total amount of color materials used is changed depending on a combination of the input amounts of color materials used.

(1-5) For "Color Material Usage Conversion Process"

The color material usage conversion process converts the amount of each color material (C, M, Y, and K) used which is input to the print system into a value that is not greater than the limit value of the total amount of color materials used, using appropriate processing (for example, the application of a calculation formula or an algorithm and the use of an LUT).

That is, the color material usage conversion process is a signal conversion process which converts an input vector into a vector in which the amount of color material used is limited to a value equal to or less than the limit value of the total amount of color materials used. For example, the color material usage conversion process converts a CMYK four-dimensional input vector into a CMYK four-dimensional vector in which the total amount of color materials used is limited to a value equal to or less than the limit value of the total amount of color materials used.

When C, M, Y, and K color materials are used, there are two main methods for reducing the total amount of color materials used. The first method reduces the amounts of C, M, and Y color materials forming gray and increases the amount of K color material, thereby reducing the total amount of color materials used, without narrowing the color reproduction gamut. For example, when (C, M, Y, K)=(50, 50, 50, 80) is established, the amounts of color materials are adjusted such that (C, M, Y, K)=(30, 30, 30, 100) is established. In this case, it is possible to reduce the total amount of color materials used from 230 to 190. In addition, in this example, the amounts of C, M, and Y are decreased by 20 and the amount of K is increased by 20. However, when conversion is strictly performed while maintaining a color or concentration, in many cases, the amounts of decrease and increase in color materials are different from each other.

The second method sacrifices the color reproduction gamut to reduce the total amount of color materials used and reduces the amount of each color material according to a given rule. For example, when (C, M, Y, K)=(30, 30, 30, 100) is established, the total amount of color materials used is 190. When the limit value of the total amount of color materials used is 180, it is necessary to reduce the amount of color materials by at least 10. However, it is difficult to apply the first method since K is already 100. Therefore, the color reproduction gamut is allowed to be narrowed. For example, the amounts of C, M, and Y are reduced by 3 to 4 such that (C, M, Y, K)=(27, 27, 26, 100) is established. In this example, the amount of K is not reduced. However, the amount of K may be reduced.

In the above-mentioned example, the case in which "it is necessary to reduce the amount of color materials by at least 10" has been described. However, the amount of color materials may be reduced by 10 or more. For example, in the case of (C, M, Y, K)=(100, 100, 100, 100), when the amount of C, M, and Y are reduced as in the second method, (C, M, Y, K)=(27, 27, 26, 100) is established and the same output vector as that in the above-mentioned example is obtained. This means that the same output vector is generated for different input vectors, which causes the gradation collapse of colors. In order to solve this problem, it is necessary to perform a process of reducing the amount of each of C, M, and Y by 10 or more, a process of reducing the amount of K, or both these processes.

The color material usage conversion process can be applied without sacrificing the amount of color material used. For example, when a "signal value" is input to the print system and the color material usage conversion process is desired to be performed in the space of the "physical amount of the color material", first, the "signal value" may be converted into the "physical amount of the color material". Then, the color material usage conversion process may be performed in the space of the "physical amount of the color material". Finally, the "physical amount of the color material" is inversely converted into the "signal value".

The color material usage conversion process can be performed on the basis of calculation using a calculation formula, as described in, for example, JP2005-101934A.

In addition, for example, output vectors for various input vectors may be defined in a look-up table (LUT) in advance and the color material usage conversion process can be performed with reference to the look-up table. When the LUT is used and output vectors for all of the input vectors are defined, storage capacity significantly increases. Therefore, the following method can be used: data of the LUT is discretely defined; and, when a certain input vector is given, an output vector is determined from a value close to the input vector in the LUT by interpolation.

Examples of the LUT applied to the color material usage conversion process are illustrated in FIGS. 1 and 2. Here, as a simple example, a "percentage" is used to define the amount of color material used. In FIGS. 1 and 2, the left side indicates an input vector and the right side indicates an output vector. The LUT is a CMYK-CMYK conversion (so-called "4-4 conversion") LUT in which a CMYK four-dimensional input vector is associated with a CMYK four-dimensional output vector. The input vector defined in the LUT corresponds to four-dimensional lattice points obtained by discretely changing the domain [0-100] of each color at a regular interval (for example, a regular interval of 10%). When the amount of each color material is changed at an interval of 10% such that the use rate of the color material is, for example, 0%, 10%, 20%, ..., 100%, the number of combinations of the use rates of all color materials is the fourth power of 11 ($11^4$=14641) since the number of use rates of each color material is 11 and four types of color materials are used.

In the table illustrated in FIG. 1, the limit value of the total amount of color materials used is set to "220". In the table illustrated in FIG. 2, the limit value of the total amount of color materials used is set to "180".

<2. For Problems when Single Limit Value of Total Amount of Color Materials Used is Used>

Next, the above-mentioned technical problem will be described in detail.

It was confirmed that a print failure did not occur due to excess color material for, for example, a vector represented by an arrow 1A or 1B illustrated in FIG. 1 when the color material usage conversion process was performed using the LUT illustrated in FIG. 1 and the "print failure caused by excess color material" occurred when a vector represented by arrow 1C, that is, an input vector (C, M, Y, K)=(100, 100, 100, 100) was converted into an output vector (40, 40, 40, 100) and printing was performed. In practice, the above-mentioned phenomenon occurs in a specific print system.

For the above-mentioned phenomenon, the relationship between the upper limit of the total amount of color materials used and the print failure caused by excess color material was experimentally analyzed. The analysis result proved that, in a combination of the print system used and the color materials, for example, when an input vector was (C, M, Y, K)=(100, 100, 100, 100), the limit value of the total amount of color materials used was set to "180" to avoid the "print failure caused by excess color material".

When a process of limiting the total amount of color materials used using a single limit value of the total amount of color materials used is performed on the basis of the analysis result, it is necessary to perform the color material usage conversion process such that the total amount of color materials used in the output vector is not greater than "180" for all of the input vectors. From this point of view, it is considered that the LUT illustrated in FIG. 2 in which the upper limit of the total amount of color materials used (the limit value of the total amount of color materials used) is limited to "180" is created and the process of limiting the total amount of color materials used is performed using the LUT illustrated in FIG. 2, instead of the LUT illustrated in FIG. 1.

When the LUT illustrated in FIG. 2 is applied, the total amount of color materials used is equal to or less than "180" for all colors included in an input vector (C, M, Y, K)=(100, 100, 100, 100) (see an arrow 2C in FIG. 2) and a print failure caused by excess color material is avoided.

However, in the above-mentioned consideration in which the process of limiting the total amount of color materials used is performed using the LUT illustrated in FIG. 2, for example, when an input vector is (C, M, Y, K)=(100, 100, 0, 0) or (C, M, Y, K)=(100, 100, 0, 20) (see arrows 2A and 2B in FIG. 2), the total amount of color materials used is limited to a smaller value by the application of the LUT illustrated in FIG. 2 even though the "print failure caused by excess color material" does not occur in the LUT illustrated in FIG. 1. As a result, the application of the LUT illustrated in FIG. 2 causes the "excessive narrowing of the color reproduction gamut".

Therefore, it is preferable to perform the color material usage conversion process such that the total amount of color materials used is 180 when an input vector is (C, M, Y, K)=(100, 100, 100, 100) and the total amount of color materials used is 220 when an input vector is (C, M, Y, K)=(100, 100, 0, 0) or (C, M, Y, K)=(100, 100, 0, 20). In this embodiment, means for appropriately changing the limit value of the total amount of color materials used depending on the color gamut is used to achieve signal conversion for appropriately limiting the total amount of color materials used according to an input vector.

<3. Details of Process According to this Embodiment>

In this embodiment, the following means is used in order to implement a color conversion process which does not excessively narrow the color reproduction gamut while avoiding a print failure caused by excess color material.

FIG. 3 is a diagram illustrating the outline of a signal conversion method according to this embodiment. In this embodiment, the color material usage conversion process which changes the limit value of the total amount of color materials used, depending on an input vector 20, is performed. FIG. 3 is a diagram schematically illustrating a signal conversion process which generates a final output vector 50 from the input vector 20. As illustrated in FIG. 3, a plurality of color material usage conversion processes S30_j (j=1, 2, . . . , n) (n is an integer equal to or greater than 2) having different limit values Lim_j (j=1, 2, . . . , n) of the total amount of color materials used are provided. Each of the plurality of color material usage conversion processes S30_j (j=1, 2, . . . , n) is performed for the input vector 20 to obtain a plurality of output vectors 25_j (j=1, 2, . . . , n) and the weighted sum of the plurality of output vectors 25_j is calculated (S40). The obtained weighted sum is used as the final output vector 50 for the input vector 20. A weight which is applied to the process of calculating the weighted sum (a "weighted sum calculation process" represented by reference numeral S40) varies depending on the input vector 20. The weight is determined on the basis of weight definition information 44 which is separately prepared in advance.

When the weights of the output vectors 25_j (j=1, 2, . . . , n) obtained by the color material usage conversion processes S30_j are $w_j$ (j=1, 2, . . . , n), the total sum of the weights are set so as to be "1" ($w_1+w_2+ \ldots +w_n=1$). Each of the weights $w_j$ (j=1, 2, . . . , n) is a real number that is equal to or greater than 0 and equal to or less than 1 and the sum of the weights is set to 1.

The color material usage conversion processes S30_j (j=1, 2, . . . , n) correspond to "input/output signal conversion processes" and output vectors 25_j (j=1, 2, . . . , n) obtained by the color material usage conversion processes S30_j (j=1, 2, . . . , n) correspond to "output vectors for limit values".

A detailed example when n is 2 will be described for simplicity of description. FIG. 4 illustrates an example of the weight definition information. In the weight definition information, weights for a single limit value of the total amount of color materials used are defined for a plurality of input vectors. In FIG. 4, it is assumed that two values of "220" and "180" are used as the limit value of the total amount of color materials used.

The limit value of the total amount of color materials used and the value of the weight are determined by performing experiments according to a combination of the print system used and the color materials and determining whether a print failure occurs due to excess color material. In addition, the definition of the upper limit of the total amount of color materials used or the weight may be changed depending on the type of recording medium used. In this case, a structure can be used which prepares a plurality of tables corresponding to the type of sheet used as a recording medium and switches the tables according to the type of sheet.

The print failure caused by excess color material is related to various factors, such as, the characteristics of the color material or recording medium used and a drying time. Therefore, the relationship between the limit value of the total amount of color materials used and the weight is calculated in advance by experiments.

Figure 5:
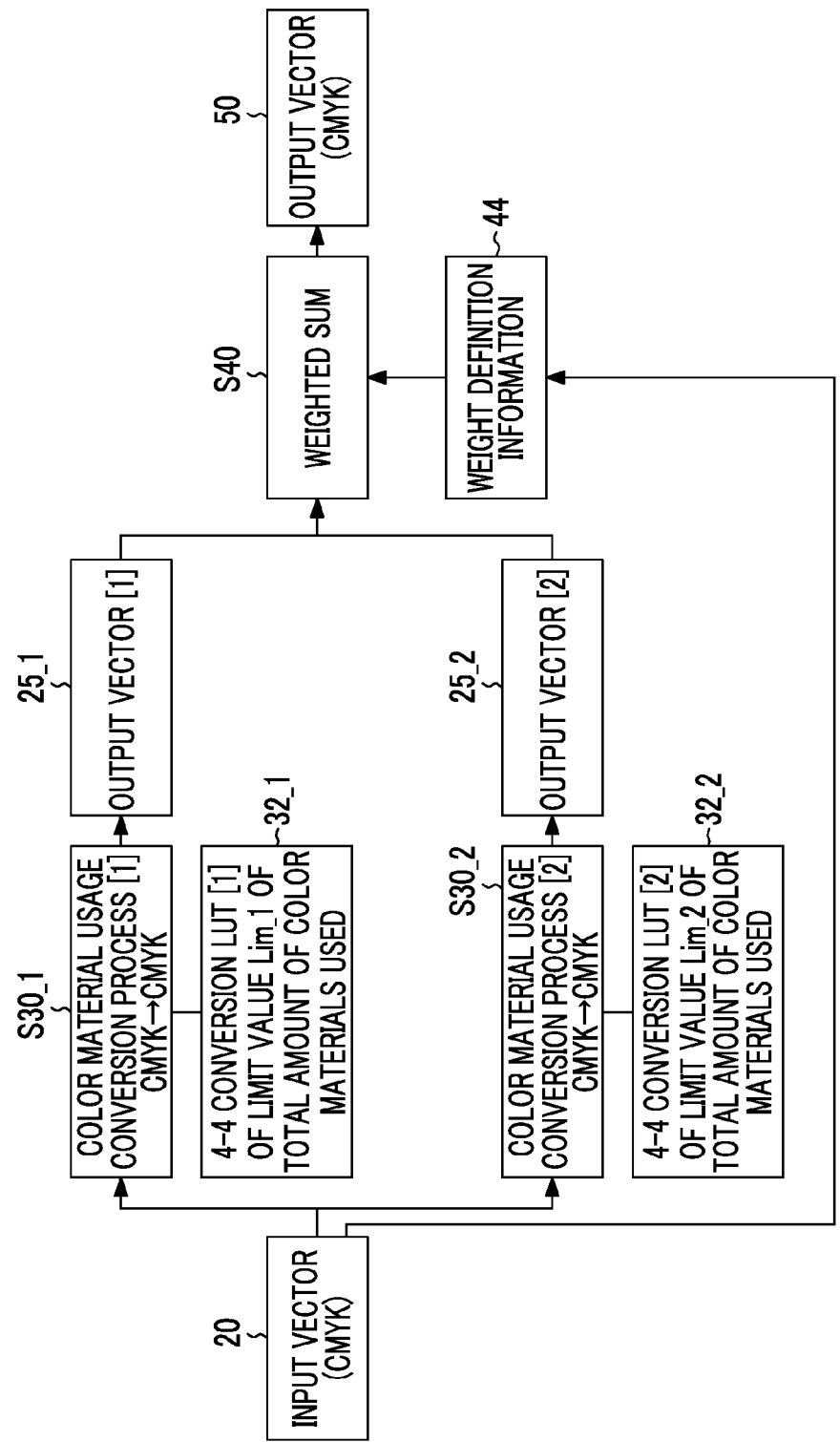
FIG. 5 is a diagram illustrating a detailed example of a process of limiting the total amount of color materials used (CMYK→CMYK) according to the embodiment.

FIG. 5 is a diagram schematically illustrating a signal conversion process using the weight definition information illustrated in FIG. 4. FIG. 5 illustrates a detailed example when "n is 2" in the structure illustrated in FIG. 3. In FIG. 5, the same or similar components as those in FIG. 3 are denoted by the same reference numerals.

In FIG. 5, a first color material usage conversion process S30_1 which performs a color material usage conversion process using a first look-up table (LUT) 32_1 for CMYK-CMYK conversion in which the limit value Lim_1 of the total amount of color materials used is set to "220" and a second color material usage conversion process S30_2 which performs a color material usage conversion process using a second look-up table (LUT) 32_2 for CMYK-CMYK conversion in which the limit value Lim_2 of the total amount of color materials used is set to "180" are applied. The weighted sum (linear sum) of output vectors 25_1 and 25_2 obtained by the conversion processes is obtained. A plurality of results of conversion from an input vector to a vector in which the total amount of color materials used is limited to the limit value or less are obtained by the first color material usage conversion process S30_1 and the second color material usage conversion process.

In this example, the table illustrated in FIG. 1 is used as a first LUT 32_1 and the table illustrated in FIG. 2 is used as a second LUT 32_2. In addition, the table illustrated in FIG. 4 is applied as the weight definition information 44.

As illustrated in FIG. 4, for example, the weight of an input vector (C, M, Y, K)=(100, 100, 0, 0) for an output vector (reference numeral 25_1 in FIG. 5) which is obtained by the color material usage conversion process (reference numeral S30_1 in FIG. 5) for the limit value, 220, of the total amount of color materials used is 1.0. In addition, the weight of the input vector (C, M, Y, K)=(100, 100, 0, 0) for an output vector (reference numeral 25_2 in FIG. 5) which is obtained by the color material usage conversion process (reference numeral S30_2 in FIG. 5) for the limit value, 180, of the total amount of color materials used is 0.0. Referring to FIGS. 1 and 2, the output vectors of the limit values, 220 and 180, of the total amount of color materials used for the input vector (100, 100, 0, 0) are (100, 100, 0, 0) and (90, 90, 0, 0), respectively. Therefore, a final output vector for the input vector (100, 100, 0, 0) is (100, 100, 0, 0)×1.0=(90, 90, 0, 0)×0.0=(100, 100, 0, 0).

As illustrated in FIG. 4, the weight of an input vector (C, M, Y, K)=(100, 100, 100, 100) for the output vector (reference numeral 25_1 in FIG. 3) which is obtained by the color material usage conversion process (reference numeral S30_1 in FIG. 3) for the limit value, 220, of the total amount of color materials used is 0.0. In addition, the weight of the input vector (C, M, Y, K)=(100, 100, 100, 100) for the output vector (reference numeral 25_2 in FIG. 3) which is obtained by the color material usage conversion process (reference numeral S30_2 in FIG. 3) for the limit value, 180, of the total amount of color materials used is 1.0. Referring to FIGS. 1 and 2, the output vectors of the limit values, 220 and 180, of the total amount of color materials used are (40, 40, 40, 100) and (27, 27, 26, 100), respectively. Therefore, a final output vector for the input vector (100, 100, 100, 100) is (40, 40, 40, 100)×0.0+(27, 27, 26, 100)×1.0=(27, 27, 26, 100).

When the weight definition information of an arbitrary input vector is defined, the same process as described above can be performed to obtain a final output vector for the arbitrary input vector. However, it takes a lot of time and effort to define the weight definition information of all of the input vectors (the process becomes complicated). For this reason, a method may be used in which the weight definition information is discretely defined for representative input vectors and, when a certain input vector is given, a weight is determined from the value of weight definition information close to the input vector by interpolation (for example, linear interpolation). It is preferable to define weights for at least 16 apexes (16 input vectors in FIG. 4) in the outer frame of a four-dimensional space in advance in order to perform interpolation in a CMYK four-dimensional space.

The sum of the weights of each input vector is "1". When n weights are used for each input vector, interpolation is performed for (n−1) weights and the remaining one weight is automatically determined.

In the weight definition information illustrated in FIG. 4, as represented by reference numeral 4A, for input vectors (C, M, Y, K)=(0, 100, 100, 0), (100, 0, 100, 0), and (100, 100, 0, 0), the weight of the process for the limit value, 220, of the total amount of color materials used is 1.0 and the weight of the process for the limit value, 180, of the total amount of color materials used is 0.0. In addition, as represented by reference numeral 4C, for an input vector (100, 100, 100, 100), the weight of the process for the limit value, 220, of the total amount of color materials used is 0.0 and the weight of the process for the limit value, 180, of the total amount of color materials used is 1.0.

Among the C, M, Y, and K color materials, when K is not used and only two types of color materials, such as M and Y, C and Y, or C and M, are fully used to express a secondary color, the upper limit of the total amount of color materials used is "220". The total amount of color materials used is "200" before the conversion of the input vectors (C, M, Y, K)=(0, 100, 100, 0), (100, 0, 100, 0), and (100, 100, 0, 0) and is less than "220" which is the upper limit (the limit value of the total amount of color materials used). Therefore, the total amount of color materials used is not limited by the color material usage conversion process (see FIG. 1).

In contrast, when all of the four types of color materials, that is, C, M, Y, and K are fully used to express a quaternary color, the upper limit of the total amount of color materials used is "180". The total amount of color materials used is "400" before the conversion of the input vector (C, M, Y, K)=(100, 100, 100, 100) and is greater than "180" which is the upper limit (the limit value of the total amount of color materials used). Therefore, the input vector is converted into a vector (27, 27, 26, 100) by the color material usage conversion process having "180" as the upper limit. The total amount of color materials used in the converted vector is limited to 180 (see FIG. 2).

The combination of the print system and the color materials used in the experiments (an ink jet printing system using an aqueous ultraviolet curable ink) has the characteristics that the likeliness of a print failure caused by excess color material occurring is greatly different depending on whether K is used or K is not used. That is, when K is used, a print failure caused by excess color material tends to be more likely to occur than that when K is not used. In particular, when all of the four types of color materials, that is, C, M, Y, and K are used considering the characteristics, the total amount of color materials used is limited to a smaller value than that when only two types of color materials, such as C and M, M and Y, or Y and C, are used to express to a secondary color.

Conversely, when a secondary color is expressed without using K, the limit value of the total amount of color materials used is less than that when all of the four types of color materials, that is, C, M, Y, and K are used to express a quaternary color. Therefore, the color reproduction gamut is wider than that in the method which limits the upper limit only to "180".

The limit value in a region in which all of the four types of color materials, that is, C, M, Y, and K are fully used (a region in which the limit value of the total amount of color materials used is to be "180") is greatly different from that in a region in which only two types of color materials other than K are fully used (the limit value of the total amount of color materials used is to be "220"). Therefore, the weight definition information 44 is determined such that the weights ($w_1$, $w_2$) are changed from (0.0, 1.0) to (1.0, 0.0) between the regions (see FIG. 4). The color gamut between the regions is appropriately set such that intermediate weights are distributed.

In FIG. 4, the weights are defined for the processing results of two types of limit values ("220" and "180") of the total amount of color materials used. However, the weight definition is not limited to the two types of limit values. For example, when a new type of limit value, 200, of the total amount of color materials used is introduced, the weight definition information may define weights for the conversion results of three types of limit values, 220, 200, and 180, of the total amount of color materials used. (However, the sum of three weights is set to 1). FIG. 6 illustrates an example of an LUT which is applied to a total color material usage conversion process when the limit value of the total amount of color materials used is "200".

FIG. 3 illustrates the generalized content when n is 2 or 3 in the above-mentioned example. As illustrated in FIG. 3, a weight corresponding to the color gamut is given to the output vectors 25_j (j=1, 2, . . . , n) of n types of color material usage conversion processes S30_j (j=1, 2, . . . , n) to which n types of different limit values Lim_j (j=1, 2, . . . , n) of the amount of color material used are applied, on the basis of the weight definition information 44, to calculate a weighted sum and the weighted sum is used as the final output vector 50 after the total amount of color materials used is limited.

The above-mentioned processing makes it possible to perform a color material usage conversion process which does not cause the "excessive narrowing of the color reproduction gamut" for any color while avoiding a "print failure caused by excess color material".

<Example of Structure of Signal Conversion Apparatus>

Figure 7:
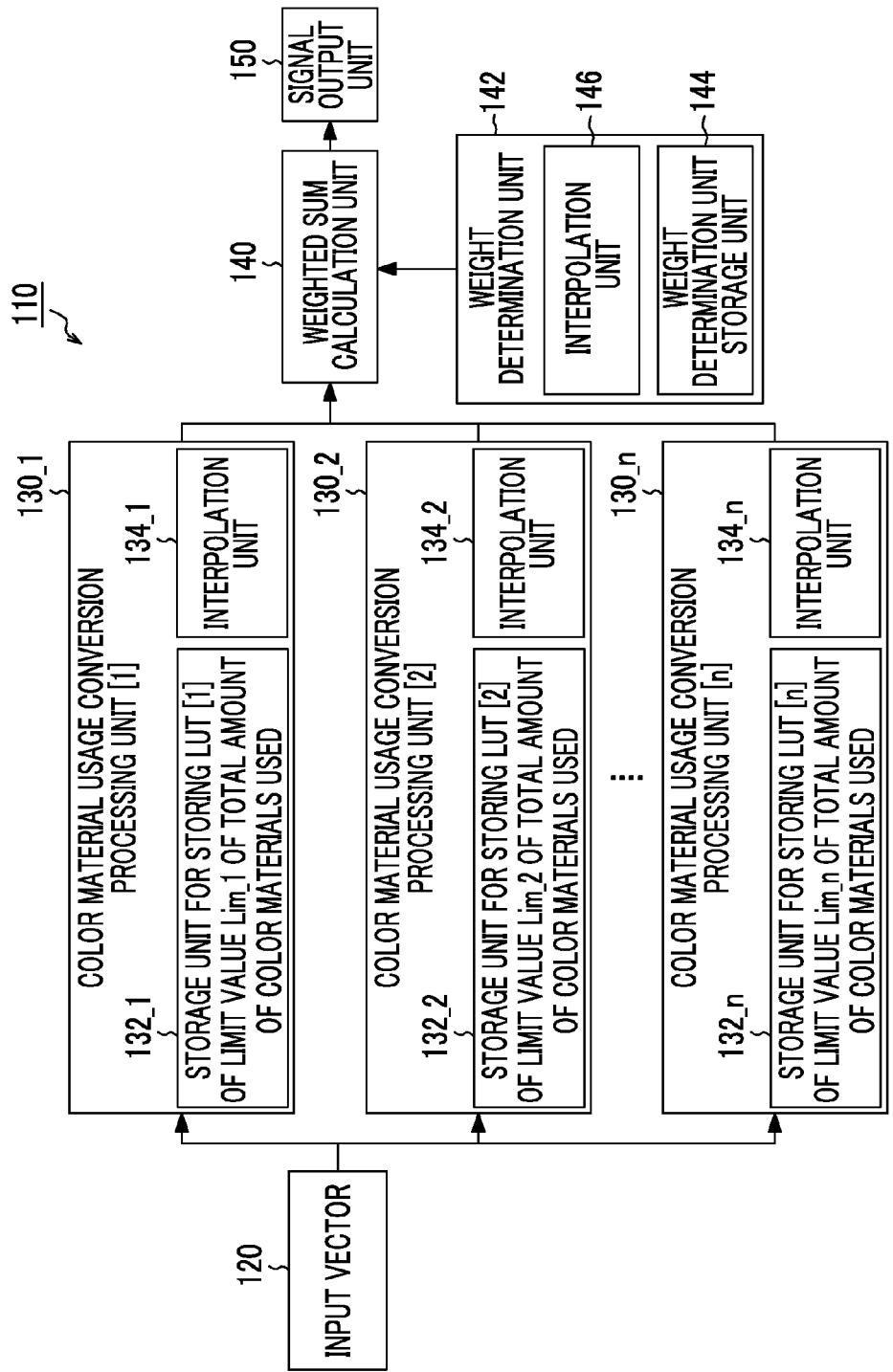
FIG. 7 is a block diagram illustrating the structure of a signal conversion apparatus according to the embodiment.

FIG. 7 is a block diagram illustrating an example of the structure of a signal conversion apparatus for implementing the conversion process described with reference to FIG. 3. A signal conversion apparatus 110 includes a signal input unit 120, n types of color material usage conversion processing units 130_j (j=1, 2, . . . , n), a weighted sum calculation unit 140, a weight determination unit 142, and a signal output unit 150. Each unit of the signal conversion apparatus 110 can be implemented by a combination of the hardware and software (program) of a computer.

The signal input unit 120 is an interface unit that acquires an input vector before color material usage conversion. Examples of the signal input unit 120 can include a data input terminal, a communication interface, and a media interface.

The color material usage conversion processing units 130_j (j=1, 2, . . . , n) include LUT storage units 132_j (j=1, 2, . . . , n) which include LUTs [j] of different limit values Lim_j of the total amount of color materials used and interpolation units 134_j (j=1, 2, . . . , n) which calculate a converted vector corresponding to an arbitrary input vector from data of the LUTs [j] which is discretely defined, using interpolation (for example, linear interpolation).

The weight determination unit 142 includes a weight definition information storage unit 144 which stores predetermined weight definition information and an interpolation unit 146 which calculates a weight corresponding to an arbitrary input vector from a table of weight definition information which is discretely defined, using interpolation (for example, linear interpolation).

The weight determination unit 142 determines a weight on the basis of the input vector from the signal input unit 120 and provides the information of the weight to the weighted sum calculation unit 140.

The weighted sum calculation unit 140 calculates the weighted sum of the output vectors of the color material usage conversion processing units 130_j, using the weight determined by the weight determination unit 142. The weighted sum obtained by linear combination is output, from the signal output unit 150, as a final output vector after the limitation of the total amount of color materials used for the input vector.

The signal output unit 150 may be, for example, a data output terminal, a communication interface, or a media interface.

<Modification Example 1>

A vector space in which the color material usage conversion processes S30_j (j=1, 2, . . . , n) are performed is not limited to the space in which percentages are used as described in the above-mentioned example. The vector space may be a space in which other values (for example, an area ratio or the physical amount of color material) indicating the amount of color material used are used.

<Modification Example 2>

In the color material usage conversion processes S30_j (j=1, 2, . . . , n), the LUT is used as described with reference to FIG. 1 or FIG. 2. However, the output vectors 25_j (j=1, 2, . . . , n) corresponding to output vectors for each limit value may be obtained from the input vector 20 by an algorithm or calculation using a calculation formula, instead of using the LUT or in addition to the LUT.

<Modification Example 3>

A plurality of color material usage conversion processes having different limit values of the total amount of color materials used may be applied to the input vector or the color material usage conversion process (input/output signal conversion process) in which the weight is "0" when the weighted sum is calculated may be omitted. When the weighted sum is calculated, the output vectors for each limit value in which the weight is "0" do not contribute to the calculation of the final output vector 50. Therefore, the process which calculates the output vectors for each limit value in which the weight is "0" may be omitted when the final output vector 50 is calculated.

<Modification Example 4>

The conversion of the input vector 20 into the output vector 50 by the signal conversion method according to this embodiment may be specified to set the input/output relationship between the input vector 20 and the output vector 50 as a look-up table (LUT).

That is, the signal conversion method described with reference to FIG. 3 can be represented in the form of an LUT in which the relationship between the input vector 20 and the output vector 50 is described. The signal conversion function of the color material usage conversion processing units 130_j (j=1, 2, . . . , n), the weighted sum calculation unit 140, and the weight determination unit 142 described with reference to FIG. 7 may be described in one LUT and the LUT may be incorporated into the apparatus.

<Modification Example 5: Coping with RGB Input>

In the above description, it is assumed that a CMYK value is input to the print system. However, many print systems support an RGB input in addition to a CMYK input.

As a method which performs the color material usage conversion process for an RGB input, there is a method which converts an RGB signal into a "CMYK signal in which the total amount of color materials used is not limited" and performs the above color material usage conversion process (CMYK→CMYK).

For example, a process which converts an RGB signal defined in an RGB color space, such as sRGB or AdobeRGB, into a signal in a CMYK color space, such as Japan Color, is performed and the CMYK signal is used as the input vector. In this way, it is possible to apply the content of the process described with reference to FIGS. 3, 5, and 7. In addition, during RGB-CMYK signal conversion, the conversion is performed such that the original colors are maintained.

In this aspect, an RGB-CMYK conversion processing unit (processing function) which converts an input RGB signal into a CMYK signal is provided. In this case, it is possible to use the structure described with reference to FIGS. 5 and 7.

In addition, a method may be used which directly converts an RGB input into the "CMYK signal in which the total amount of color materials used is not limited". That is, in the method, an "RGB-CMYK" conversion process is performed during the color material usage conversion process. The invention can also be applied to this case.

The process which directly performs the color material usage conversion and the RGB-CMYK conversion from the RGB input is referred to as a "color material usage conversion process (RGB→CMYK)".

When a process which directly generates the CMYK signal in which the total amount of color materials used is not limited from an RGB input vector is implemented, similarly to FIG. 3, a weighted sum is calculated from the results of a plurality of color material usage conversion processes (RGB→CMYK) on the basis of the weight definition information and the calculation result is used as the result of a final color material usage conversion process (RGB→CMYK).

The weight definition information used in this case needs to be defined as a weight for an RGB input, separately from a CMYK input. That is, weight definition information in which the input vector (CMYK) described with reference to FIG. 4 is an RGB input is prepared. A method may be used in which, similarly to the CMYK input described with reference to FIG. 4, the weight definition information of the RGB input is discretely defined and, when a certain input vector (RGB) is given, a weight is determined from the value of weight definition information close to the input vector by interpolation. It is preferable to define weights for at least 8 apexes in the outer frame of a three-dimensional space in advance in order to perform interpolation in a RGB three-dimensional space.

Figure 8:
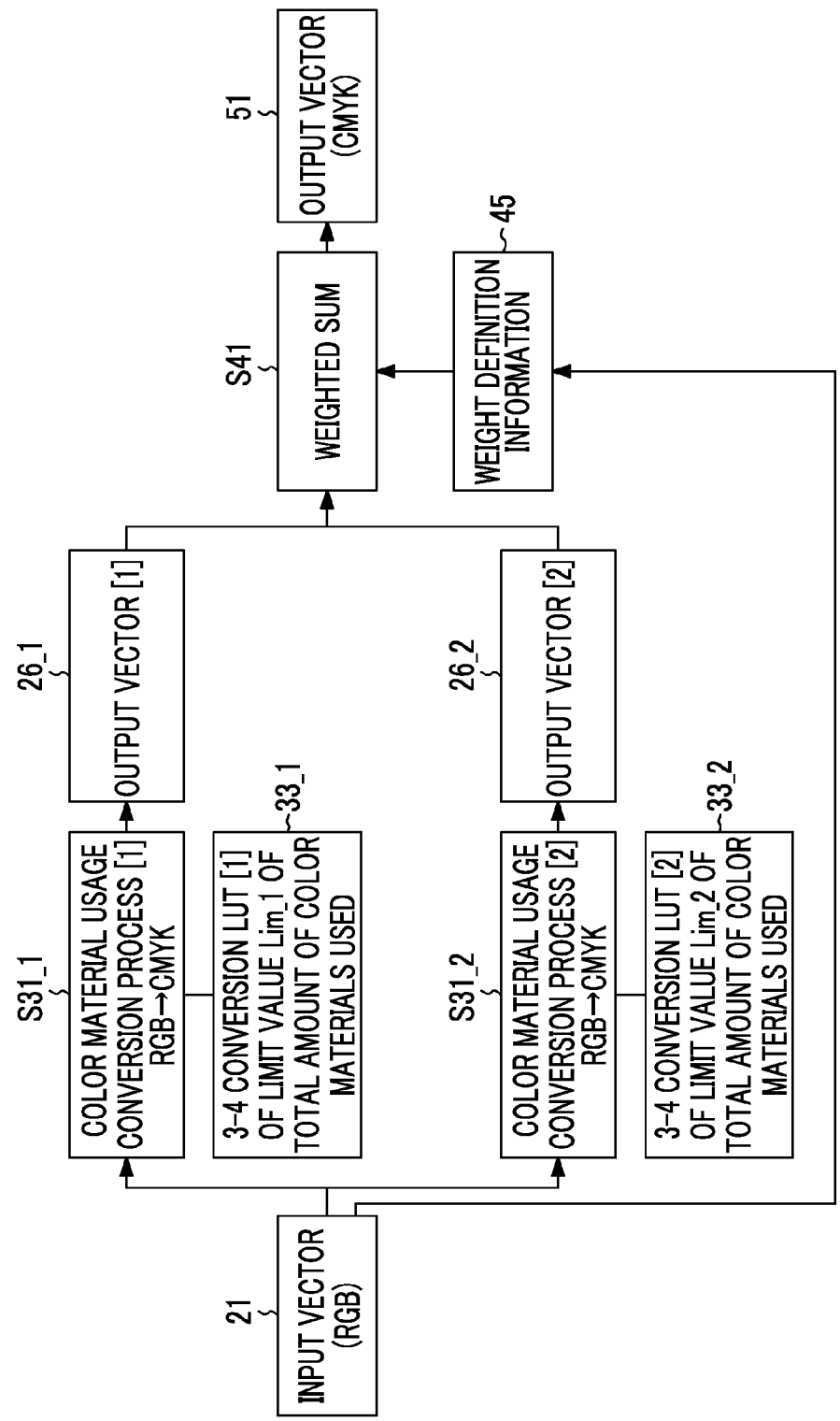
FIG. 8 is a diagram illustrating a detailed example of a process of limiting the total amount of color materials used (RGB→CMYK) according to another embodiment of the invention.

FIG. 8 is a conceptual diagram illustrating the outline of the procedure of a color material usage conversion process which directly obtains a CMYK output from an RGB input.

FIG. 8 illustrates a detailed example when "n is 2" in the structure illustrated in FIG. 3.

In FIG. 8, a first color material usage conversion process S31_1 which performs color material usage conversion (RGB→CMYK) using a first look-up table (LUT) 33_1 for RGB-CMYK conversion in which the limit value Lim_1 of the total amount of color materials used is set to "220" and a second color material usage conversion process S31_2 which performs color material usage conversion (RGB→CMYK) using a second look-up table (LUT) 33_2 for RGB-CMYK conversion in which the limit value Lim_2 of the total amount of color materials used is set to "180" are performed for an RGB input vector 21 to obtain CMYK output vectors 26_1 and 26_2. Then, the weighted sum of the CMYK output vectors 26_1 and 26_2 obtained by the conversion processes (S31_1 and S31_2) is obtained. Then, the obtained weighted sum is used as a final CMYK output vector 51 for the input vector 21 (n is an integer equal to or greater than 2).

The first LUT 33_1 and the second LUT 33_2 are tables in which input R, G, and B are associated with output C, M, Y, and K. In the first LUT 33_1, the upper limit of the total amount of output C, M, Y, and K used is limited to "220". In the second LUT 33_2, the upper limit of the total amount of output C, M, Y, and K used is limited to "180".

The output vectors 26_1 and 26_2 obtained by the first color material usage conversion process S31_1 and the second color material usage conversion process S31_2 correspond to "output vectors for each limit value".

The weight which is applied to the process (a "weighted sum calculation process" represented by reference numeral S41) for calculating the weighted sum varies depending on the RGB input vector 21. The weight is determined on the basis of weight definition information 45 which is separately prepared in advance.

The above-mentioned processing makes it possible to perform a color material usage conversion process which does not cause the "excessive narrowing of the color reproduction gamut" for any color while avoiding a "print failure caused by excess color material".

The structure illustrated in FIG. 8 may be used, instead of the structure illustrated in FIG. 5, or may be combined with the structure illustrated in FIG. 5. In this case, it is possible to directly obtain a CMYK signal in which the total amount of color materials used is appropriately limited from an RGB input.

The structure illustrated in FIG. 8 corresponds to the case of n=2 illustrated in FIG. 3. However, it is clear that the invention can be expanded (generalized) to a structure in which n is an integer equal to or greater than 2, similarly to the structure illustrated in FIG. 5. The structure of the signal conversion apparatus illustrated in FIG. 7 can also be applied to a color material usage conversion process (RGB→CMYK).

<Modification Example 6>

The invention can also be applied to a print system using five or more types of color materials including four types of color materials, that is, C, M, K, and Y, and at least one of light cyan, light magenta, and special colors. In addition, the invention can be applied to a print system using only three types of color materials, that is, C, M, and Y, or a print system using only two types of color materials. For example, the invention can also be applied to the case in which, during two-color printing, that is, CM printing, the "print failure caused by excess color material" does not occur when (C, M) is (100, 80) and occurs when (C, M) is (80, 100).

<Example 1 of Structure of Print System>

Figure 9:
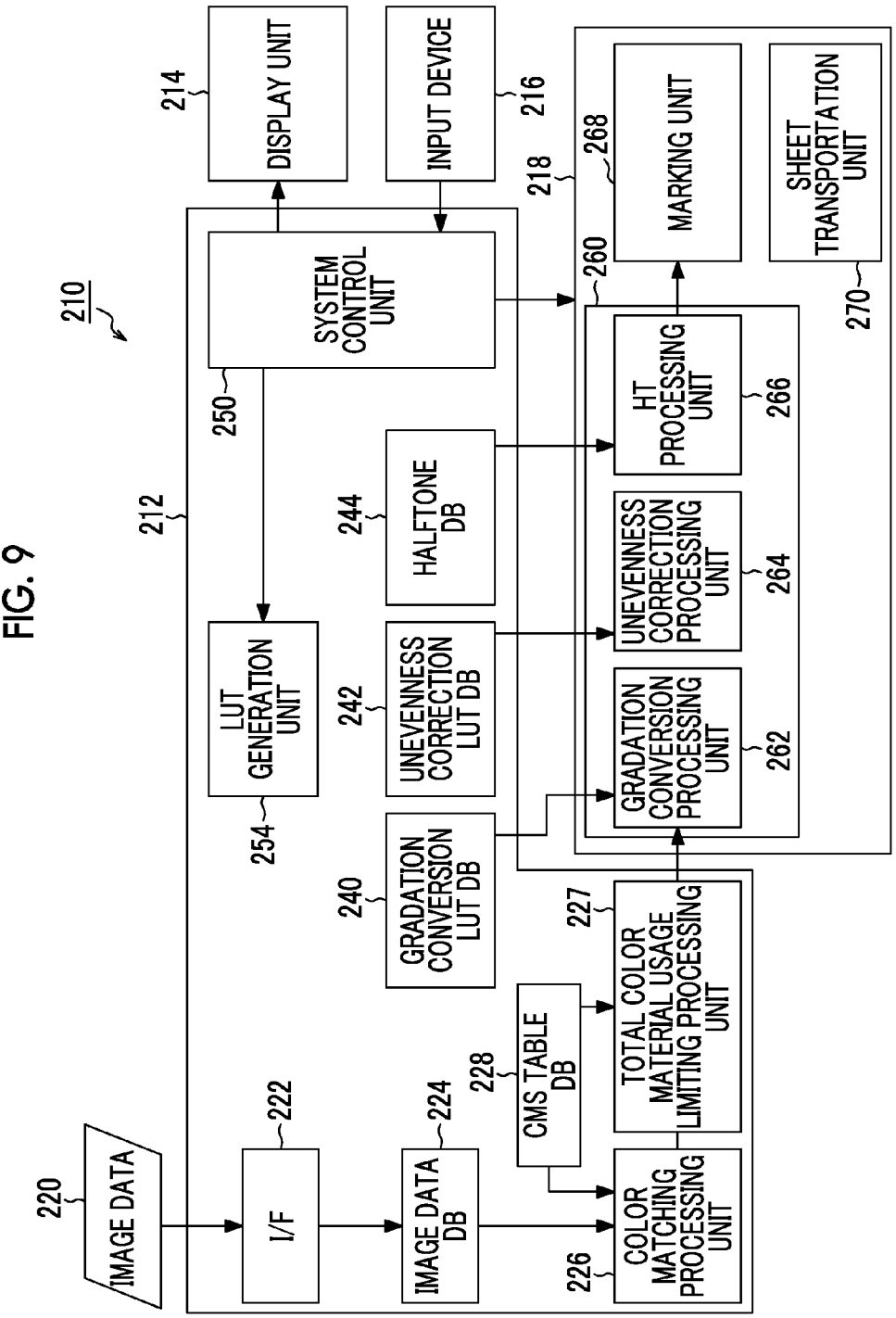
FIG. 9 is a block diagram illustrating an example of the structure of a print system according to the embodiment of the invention.

FIG. 9 is a block diagram illustrating an example of the structure of the print system according to the embodiment of the invention.

A print system 210 includes a computer body (hereinafter, referred to as a "PC") 212, a monitor 214 serving as a display unit, an input device 216, and a printer 218.

An example in which an ink jet printer is used as the printer 218 will be described. However, the printer 218 is not limited to the ink jet printer. For example, other digital printing machines, such as electrophotographic printers, offset printing machines, and various types of other printing devices (which are synonymous with "printers", "printing machines", "printing apparatuses", and "printers") can be used.

The PC 212 has an image data management function, an image data processing function, and an image processing parameter management function. That is, the PC 212 functions as image data management means, image data processing means, and image processing parameter management means. In addition, the PC 212 has a function of controlling the printer 218 and functions as printer control means.

The monitor 214 and the input device 216 are connected to the PC 212. The monitor 214 and the input device 216 function as a user interface (UI). Various types of means, such as a keyboard, a mouse, a touch panel, and a trackball, may be used as the input device 216 or they may be appropriately combined with each other. An operator can input various kinds of information, using the input device 216, while viewing content displayed on a screen of the monitor 214, and can operate the printer 218. In addition, the operator can check (confirm), for example, the state of the system through the monitor 214.

The PC 212 includes an image input interface (I/F) unit 222 for acquiring image data 220, a database (hereinafter, referred to as an "image data DB") 224 serving as image data storage means for storing the acquired image data, a color matching processing unit 226, a total color material amount limiting processing unit 227, and a database (hereinafter, referred to as a "color management system (CMS) table DB") 228 serving as CMS data storage means for storing table data (CMS table) used for color management.

In addition, the PC 212 includes a database (hereinafter, referred to as a "gradation conversion LUT DB") 240 which stores a gradation conversion look-up table (hereinafter, referred to as a "gradation conversion LUT"), a database (hereinafter, referred to as an "unevenness correction LUT DB") 242 which stores an unevenness correction look-up table (hereinafter, referred to as an "unevenness correction LUT"), a database (hereinafter, referred to as a "halftone DB") 244 which stores halftone processing (quantization process) parameters, and a system control unit 250 which controls the overall operation of the system.

The image input interface unit 222 which functions as an input unit for image data 220 may be a wired or wireless communication interface unit, a media interface unit which reads or writes data from or to an external storage medium (removable device), such as a memory card, or a combination thereof.

The image data 220 which has been input to the PC 212 through the image input interface unit 222 is registered in the image data DB 224. A list of the image data registered in the image data DB 224 can be displayed on the monitor 214. The operator can operate the input device 216 to determine whether to print target image data while viewing the image data displayed on the monitor 214. The operator can designate the printing conditions (for example, the type of sheet, a sheet size, the number of sheets, color/black and white, color correction, and shading correction) of each image data item registered in the image data DB 224 through the monitor 214 and the input device 216.

The printing conditions include appropriate data for the parameters of the gradation conversion LUT DB 240, the unevenness correction LUT DB 242, and the halftone DB 244, in addition to the above-mentioned items. Appropriate data is selected from each database (240 to 244) according to the designated conditions, such as the type of sheet or a sheet size, for each image data item to be printed. Then, data for the printing conditions including the above-mentioned information is allocated to each image data item.

When the execution of printing is instructed, the image data 220 is transmitted from the image data DB 224 to the printer 218. While the image data 220 is being transmitted to the printer 218, the color matching processing unit 226 and the total color material amount limiting processing unit 227 perform image processing for the image data 220.

The color matching processing unit 226 performs a process of converting the device value of the image data such that an image is printed in colors defined in the image data. For example, there may be two tables, that is, a table in which the relationship between the CMYK value of image data and a chromaticity value (which is the value of a color defined in a device-independent color space; in this example, a CIE-L*a*b* value is used) is described and a table in which the relationship between the device value (CMYK) of the printer 218 and a chromaticity value is described, and a CMYK-CMYK conversion relationship is determined such that the chromaticity values in the two tables are matched with each other. Alternatively, a process of converting an RGB value into a CMYK value may be performed.

The total color material amount limiting processing unit 227 performs the process of limiting the total amount of color materials used which has been described with reference to FIGS. 1 to 8.

The tables used by the color matching processing unit 226 and the total color material amount limiting processing unit 227 can be stored in the CMS table DB 228. An appropriate table can be selected according to conditions, such as the type of sheet, color reproduction conditions, and the upper limit of the total amount of ink, and can be used. The PC 212 including the color matching processing unit 226 and the total color material amount limiting processing unit 227 which participate in image data color conversion functions as a "signal conversion apparatus".

The PC 212 includes an LUT generation unit 254. The LUT generation unit 254 generates data, such as a gradation conversion LUT, an unevenness correction LUT, and a halftone table, in response to a control signal from the system control unit 250 or a command signal (operation signal) input from the input device 216. For example, the LUT generation unit 254 performs signal processing for creating an unevenness correction look-up table (LUT) for correcting concentration unevenness which depends on the recording position of a marking unit 268 from the reading result of a test pattern output from the printer 218.

The system control unit 250 controls calculation in each processing unit, such as the color matching processing unit 226, the total color material amount limiting processing unit 227, and the LUT generation unit 254, controls the display of the monitor 214, and performs control corresponding to a command input from the input device 216. The system control unit 250 transmits a signal to an image process board 260 or a sheet transportation unit 270 of the printer 218 to control the operation of the printer 218.

Each unit (components represented by reference numerals 222 to 254) of the PC 212 illustrated in FIG. 9 is formed by the hardware or software (program) of the PC 212 or a combination thereof When the operator selects the image data to be printed from the list of the image data registered in the image data DB 224 and instructs the execution of printing, the selected image data is transmitted from the image data DB 224 in the PC 212 to the printer 218 through the color matching processing unit 226 and the total color material amount limiting processing unit 227.

In addition, parameters corresponding to the printing conditions are set in the image process board 260 in the printer 218.

The printer 218 includes the image process board 260 which performs signal processing for converting the image data received from the PC 212 into a marking signal, the marking unit 268 which performs printing on the basis of the marking signal, and the sheet transportation unit 270. In addition, the printer 218 includes a color material supply unit (for example, an ink supply system which supplies ink to an ink jet head) (not illustrated). The image process board 260 includes a gradation conversion processing unit 262, an unevenness correction processing unit 264, and a halftone processing unit 266 and performs a gradation conversion process, an unevenness correction process, and a halftone process for the input image data to generate the marking signal. The image data input to the image process board 260 is processed by each processing unit (262, 264, and 266) and an image based on the image data is drawn by the marking unit 268.

When the image is formed by the marking unit 268, the gradation conversion processing unit 262 performs a process of determining concentration gradation characteristics indicating the overall color density of the image. The gradation conversion processing unit 262 converts the image data such that color characteristics defined by the printer 218 are obtained. For the signal conversion performed by the gradation conversion processing unit 262, a conversion relationship is determined with reference to the gradation conversion LUT stored in the gradation conversion LUT DB 240 of the PC 212. The gradation conversion LUT DB 240 stores a plurality of LUTs which are optimized for each type of print sheet (recording medium) and an appropriate LUT is referred to according to the type of sheet to be used. The gradation conversion LUT is prepared for each color material (for example, for each ink color). In this example, the gradation conversion LUT is provided for each of C, M, Y, and K.

When a printing execution instruction is input, the gradation conversion LUT suitable for the printing conditions is automatically selected and then set to the gradation conversion processing unit 262 of the printer 218. In addition, the operator can input an instruction to select, change, or correct the LUT through the input device 216 to set a desired LUT.

When printing is performed by the marking unit 268 on the basis of an input signal with a predetermined gradation value, the unevenness correction processing unit 264 performs a process of correcting an output concentration at each recording position such that the concentration defined by the gradation conversion processing unit 262 is uniform on the entire surface of the recording medium (sheet). For example, in the ink jet head, ejection characteristics vary depending on nozzles and the amount of liquid droplets ejected is not necessarily uniform. The unevenness correction processing unit 264 performs signal conversion in order to correct output concentration unevenness, which is caused by a variation in the ejection performance of each nozzle, for each nozzle.

That is, in the ink jet printing system, the unevenness correction processing unit 264 converts the image signal such that the amount of ink ejected from each of a plurality of ink ejection nozzles in the ink jet head forming the marking unit 268 is corrected to fall within a predetermined allowable range in the head and between the heads and color unevenness does not occur in an image surface.

In this conversion process, a conversion relationship is determined with reference to the unevenness correction LUT stored in the unevenness correction LUT DB 242 of the PC 212. The unevenness correction LUT DB 242 stores a plurality of types of unevenness correction LUTs which are optimized for each type of print sheet (each type of sheet) and an LUT which is suitable for the sheet to be used is referred to.

FIG. 9 illustrates an example in which the gradation conversion process and the unevenness correction process are performed in stages for convenience of explanation. However, the invention is not limited thereto. A calculation method may be used which combines the gradation conversion LUT and the unevenness correction LUT into one LUT and collectively performs these conversion processes. The converted signal generated by the gradation conversion process and the unevenness correction process is input to the halftone processing unit 266.

The halftone processing unit 266 converts, for each pixel, a multi-tone (for example, 8 bits (256 gradations) per color material) image signal into a binary signal indicating the recording/non-recording of a dot or a multi-valued signal (for example, a quaternary signal indicating a large dot, a medium dot, a small dot, and no recording when three types of dots, that is, a large dot, a medium dot, and a small dot are used) which includes the type of dot indicating the size of the dot to be recorded when a dot size can be selected. In general, the halftone processing unit 266 performs a process of converting M-valued (M is an integer that is equal to or greater than 3) multi-tone image data into N-valued (N is an integer that is equal to or greater than 2 and less than M) data. For example, a dither method, an error diffusion method, and a concentration pattern method can be applied to the halftone (quantization) process.

In the signal conversion process of the halftone processing unit 266, a conversion relationship is determined with reference to a table (halftone table) stored in the halftone DB 244 of the PC 212.

The halftone DB 244 stores a plurality of types of halftone tables and any one of the halftone tables is selected during printing. The plurality of types of halftone tables in which the use rate of various types of dots for an input signal value is determined are prepared and any one of the halftone tables is selected during printing. The halftone processing unit 266 performs a halftone process corresponding to the selected halftone table to convert a continuous-tone image of C, M, Y, and K to a dot image of each color.

The multi-valued signal (for example, the quaternary marking signal) generated by the halftone processing unit 266 is transmitted to the marking unit 268 and the recording operation of the marking unit 268 is controlled on the basis of the marking signal.

There are various types of marking units 268 corresponding to the types of printers 218. For example, in the ink jet printing system, the marking unit 268 includes an ink jet head as the liquid ejection head. In this embodiment, it is assumed that four color inks, that is, cyan (C), magenta (M), yellow (Y), and black (K) inks are used and ink jet heads for each color are provided as means for ejecting each color ink.

For example, aqueous ultraviolet curable ink is used as the ink. An example of the aqueous UV ink is an aqueous radical UV ink using a component containing an aqueous ethylenic unsaturated group. In the embodiment of the invention, the type of ink is not limited to the above-mentioned examples. Ink with various compositions can be used.

The driving of ejection energy generation elements (for example, piezoelectric elements or heating elements) for the corresponding nozzles is controlled by the marking signal for each color material which is generated by the halftone processing unit 266 and the ejection of ink from each nozzle is controlled.

The sheet transportation unit 270 is means for transporting a sheet as the recording medium. The sheet may be flat paper or continuous form paper. A sheet transportation method is not particularly limited. For example, various transportation methods, such as a drum transportation method, a belt transportation method, a nip transportation method, or an appropriate combination thereof, can be used.

An ink jet printing system which records an image using a single pass method can record an image with a predetermined recording resolution (for example, 1200 dpi) in an image forming region of the recording medium, using only one operation of moving a recording medium (sheet) relative to the ink jet heads of each color (one sub-scanning). A plurality of ink ejection nozzles are arranged in the ink ejection surface (nozzle surface) of each head over a length corresponding to the maximum width of an image forming region of the sheet. A high recording resolution can be achieved by the structure in which a plurality of nozzles are two-dimensionally arranged in the ink ejection surface.

In the case of an ink jet head having a two-dimensional nozzle array, it can be considered that a projection nozzle row obtained by projecting each nozzle (orthogonal projection) so as to be arranged in a direction (corresponding to a main scanning direction) perpendicular to the transportation direction of a medium in the two-dimensional nozzle array is equivalent to a nozzle row in which nozzles are arranged substantially at regular intervals in the main scanning direction (the width direction of the medium) at a nozzle density capable of achieving a recording resolution. The term "substantially at regular intervals" means that the intervals between the dots which can be recorded by the inkjet printing system are substantially equal to each other. For example, the concept of "regular intervals" includes a case in which the intervals are slightly different from each other, considering the movement of droplets on a medium due to a manufacturing error or landing interference. When the projection nozzle row (which is also referred to as a "substantial nozzle row") is considered, the positions of the nozzles (nozzle numbers) can be associated with each other in the order in which the projection nozzles are arranged in the main scanning direction. The "position of the nozzle" means the substantial position of the nozzle in the nozzle row.

Figure 10:
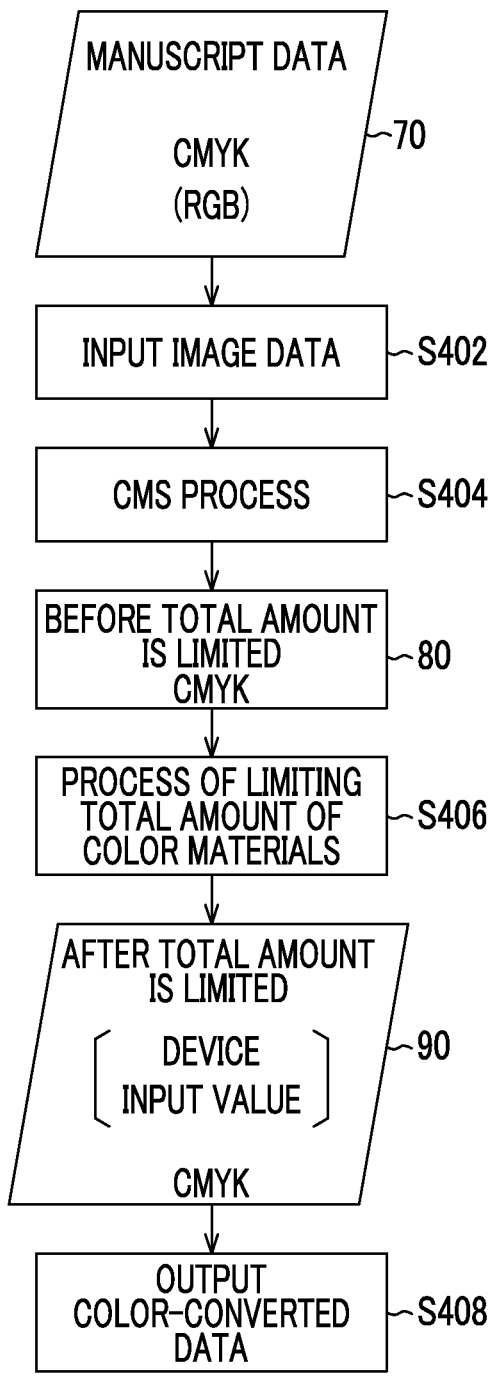
FIG. 10 is a flowchart illustrating the procedure of a process according to the embodiment.

FIG. 10 is a flowchart illustrating the flow of an image data color conversion process of the PC 212.

First, there is manuscript data 70 to be printed and the manuscript data 70 is input to the PC 212 (an "image data input step" of Step S402). The manuscript data 70 is CMYK data or RGB data and is created on the basis of a specific target profile.

A CMYK (or RGB) value of the manuscript data 70 can be converted into a CMYK value of a printing device ("CMS processing step" of Step S404). The CMYK value of the printing device converted by the CMS processing step of Step S404 corresponds to CMYK data (in FIG. 10, reference numeral 80) before the total amount of color materials is limited. Therefore, the CMYK data before the total amount is limited is converted into CMYK data after the total amount is limited by a total color material amount limiting process (Step S406).

In the total color material amount limiting process (Step S406), the signal conversion process of converting the input vector 20 into the output vector 50, which has been described with reference to, for example, FIG. 3 is performed. Then, the CMYK data (reference numeral 90) after the total amount is limited, which is generated by the total color material amount limiting process (Step S406), is output as color-converted data (Step S408; a "data output step"). The CMYK data 90 after the total amount is limited is input to the printing device and printing is performed.

The process in the CMS processing step (Step S404) is performed by the color matching processing unit 226 illustrated in FIG. 9. The process in the total color material amount limiting step (Step S406 in FIG. 10) is performed by the total color material amount limiting processing unit 227 illustrated in FIG. 9. The color-converted data output step (Step S408 in FIG. 10) is performed by a data output unit (not illustrated) which transmits data from the PC 212 to the printer 218 in FIG. 9.

According to the print system 210 of this embodiment, it is possible to appropriately limit the total amount of color materials used according to the color gamut, to avoid a print failure caused by an excess color, and to prevent the color reproduction gamut of all colors from being excessively narrowed. Therefore, it is possible to prevent the color reproduction gamut from being narrowed due to the limitation of the total amount of color materials, as compared to the structure according to the related art. As a result, it is possible to sufficiently use the latent color reproducibility of the print system.

<Another Example of Structure of Print System>

FIG. 11 is a diagram illustrating the overall structure of a print system according to another embodiment of the invention. A print system 310 includes a front-end computer 312 which generates image data (hereinafter, referred to as "document image data" in some cases) indicating the content of an image to be printed, an image processing apparatus 314 which functions as a profile creation apparatus for creating a table (profile) for a color conversion process and a color conversion apparatus for performing the color conversion process using the created profile, a colorimeter 316, a printing machine 318 serving as a color image output device (printing device), a controller 320 which controls the printing machine 318, and a management computer 322. The front-end computer 312, the image processing apparatus 314, the controller 320, and the management computer 322 are connected to a communication network 324 such as a local area network (LAN).

Although not illustrated in FIG. 11, in addition to the components illustrated in FIG. 11, for example, a plate making apparatus, such as a plate recorder, a controller for the plate making apparatus, a printing machine which performs printing using a printing plate made by the plate making apparatus, and a plurality of computers may be connected to the communication network 324. For example, the number of front-end computers 312, management computers 322, printing machines 318, and plate making apparatuses included in the system is not particularly limited.

For example, the functions of the front-end computer 312, the image processing apparatus 314, the controller 320, and the management computer 322 may be implemented by one computer or a plurality of computers. The image processing apparatus 314 and the controller 320 may be integrated and the functions thereof may be implemented by one computer. The functions of the image processing apparatus 314 may be provided in the management computer 322.

The front-end computer 312 is used to perform an operation of editing various types of image components, such as characters, figures, designs, illustrations, picture images to be printed and laying out the image components on a printing surface. Document image data as original print image data is generated by, for example, the editing operation with the front-end computer 312. The document image data generated by the front-end computer 312 is transmitted to the image processing apparatus 314 or the controller 320. Means for creating the document image data is not limited to the front-end computer 312. For example, the document image data may be created by another computer or an image creation and editing apparatus (not illustrated). The document image data can be input to, for example, the image processing apparatus 314 or the controller 320 through the communication network 324 or using a removable medium (external storage medium) such as a memory card.

The image processing apparatus 314 performs a process of generating a color profile for managing print colors and a color conversion process. The image processing apparatus 314 functions as the signal conversion apparatus 110 according to the embodiment of the invention. In addition, the image processing apparatus 314 functions as a color conversion apparatus and also functions as means for performing a rasterization process (RIP process) for document image data for printing (for example, data described by a page description language) which is generated by, for example, the front-end computer 312. The image processing apparatus 314 can be implemented by a combination of the hardware and software (program) of the computer. The functions of a RIP apparatus may be provided in the controller 320 of the printing machine 318.

The colorimeter 316 is means for measuring a color patch on a color chart printed on a recording medium. For example, a spectrophotometer can be used as the colorimeter 316. Information measured by the colorimeter 316 is provided to the image processing apparatus 314.

Various types of printing devices, such as an ink jet printer, an offset printing machine, and an electrophotographic printer, can be used as the printing machine 318. In the case of a printing machine using a printing plate, for example, a plate making apparatus, such as a plate recorder, a controller for the plate making apparatus, and a printing machine which performs printing using the printing plate made by the plate making apparatus are connected to the communication network 324. In addition, a combination of the plate making apparatus, the controller for the plate making apparatus, and the printing machine using the printing plate can be interpreted as a "printing device".

The management computer 322 performs various types of management processes in the print system 310. For example, the management computer 322 performs image management and print job management.

In this example, the front-end computer 312, the image processing apparatus 314, the controller 320, and the management computer 322 are connected to the communication network 324 such as a local area network (LAN). In the invention, each component may not be necessarily connected to the communication network 324.

<For Program>

The signal conversion processing function according to the above-described embodiment can be implemented by a computer. That is, it is possible to provide a program which causes the computer to implement the functions corresponding to each step of the signal conversion method described with reference to FIGS. 1 to 10.

The signal conversion processing function can be provided by an information recording medium which is a computer-readable tangible medium having the program recorded therein. Examples of the information recording medium include various types of media, such as a magnetic disk, a memory card, an optical disc, a hard disk drive (HDD), and a flash memory drive (solid state drive (SSD)). In addition, the program may be provided as program data (or signal) through a communication line such as the Internet.

In the above-described embodiment of the invention, components can be appropriately changed, added, or deleted, without departing from the scope and spirit of the invention. The invention is not limited to the above-described embodiment and it will be understood by those skilled in the art that various modifications and changes of the invention can be made in the technical scope of the invention.

EXPLANATION OF REFERENCE

20: input vector
21: input vector
25_j (j=1, 2, . . . , n): output vector (output vector for each limit value)
26_j (j=1, 2, . . . , n): output vector (output vector for each limit value)
50: output vector
51: output vector
110: signal conversion apparatus
130_j (j=1, 2, . . . , n): color material usage conversion processing unit (input/output signal conversion processing unit)
134_j (j=1, 2, . . . , n): interpolation unit
140: weighted sum calculation unit
142: weight determination unit
144: weight definition information storage unit
146: interpolation unit
210: print system
212: computer body
218: printer (printing device)
227: total color material amount limiting processing unit
268: marking unit
310: print system
314: image processing apparatus
320: controller
318: printing machine

What is claimed is:

1. A signal conversion method for converting an image signal in order to limit a total amount of color materials used in a printing device that forms an image on a recording medium using a plurality of color materials, comprising:
preparing a plurality of input/output signal conversion processes based on different limit values such that a plurality of results of conversion from an input vector to a vector in which the total amount of color materials used is limited to a value equal to or less than the limit value are generated; and
determining a final output vector after the total amount of color materials used is limited for the input vector, on the basis of the plurality of input/output signal conversion processes and weight definition information in which weights applied to the conversion results of the plurality of input/output signal conversion processes are determined according to the input vector; and
further comprising:
  a step of applying the plurality of input/output signal conversion processes to the input vector to generate a plurality of output vectors for each limit value in which the total amount of color materials used is limited to a value that is equal to or less than each limit value;
  a step of calculating a weighted sum of the plurality of output vectors for each limit value, using the weights determined from the weight definition information, and determining the output vectors; and
  a step of outputting a converted image signal based on the final output vector, the converted image signal being usable, by a printing device, to form an image on a recording medium.

2. The signal conversion method according to claim 1, wherein C, M, Y, and K color materials are used as the plurality of color materials.

3. The signal conversion method according to claim 2, wherein the input/output signal conversion process generates a CMYK four-dimensional output vector for each limit value from a CMYK four-dimensional input vector.

4. The signal conversion method according to claim 2, wherein the input/output signal conversion process generates a CMYK four-dimensional output vector for each limit value from an RGB three-dimensional input vector which is described by R, G, and B color components.

5. The signal conversion method according to claim 2, wherein, when only two types of C and M, M and Y, or Y and C color materials among C, M, Y, and K are fully used to express a secondary color, the total amount of color materials used is more than the total amount of color materials used when all of four types of C, M, Y, and K color materials are fully used to express a quaternary color.

6. The signal conversion method according to claim 1, wherein, in a vector space in which the input/output signal conversion process is performed, any one of a signal value, a percentage, an area ratio, and a physical amount of a color material is used as a value indicating the amount of color material used.

7. The signal conversion method according to claim 1, wherein the input/output signal conversion process is performed by calculation using a calculation formula.

8. The signal conversion method according to claim 1, wherein the input/output signal conversion process is performed using a look-up table.

9. The signal conversion method according to claim 8, wherein the input/output signal conversion process includes a step of performing an interpolation process using data defined by the look-up table.

10. The signal conversion method according to claim 1, further comprising:
  a step of performing the interpolation process using data defined by the weight definition information to determine the value of the weight.

11. The signal conversion method according to claim 1, wherein the printing device is any one of an ink jet printer, an electrophotographic printer, and an offset printing machine.

12. The signal conversion method according to claim 1, wherein the color material is ink or toner.

13. A signal conversion apparatus that converts an image signal in order to limit a total amount of color materials used in a printing device which forms an image on a recording medium using a plurality of color materials, comprising:
  a plurality of input/output signal conversion processing units that include a plurality of LUT storage units storing LUTs of different limit values of the total amount of color materials used and a plurality of interpolation units performing respective interpolation calculations using LUTs stored in the LUT storage units and perform an input/output conversion process on the basis of different limit values such that a plurality of results of conversion from an input vector to a vector in which the total amount of color materials used is limited to a value equal to or less than the limit value are generated,
further comprising:
  a weight definition information storage unit that stores the weight definition information; and
  a weighted sum calculation unit,
wherein the plurality of input/output signal conversion processing units generate a plurality of output vectors for each limit value in which the total amount of color materials used is limited to a value that is equal to or less than each limit value, and
the weighted sum calculation unit calculates a weighted sum of the plurality of output vectors for each limit value, on the basis of the plurality of output vectors for each limit value and the weight definition information,
wherein a final output vector after the total amount of color materials used is limited for the input vector is determined, on the basis of the plurality of input/output signal conversion processing units and the weight definition information in which weights applied to the conversion results of the plurality of input/output signal conversion processing units are determined according to the input vector, and
wherein the apparatus further comprises a signal output unit that outputs a converted image signal based on the final output vector, the converted image signal being usable, by a printing device, to form an image on a recording medium.

14. The signal conversion apparatus according to claim 13, wherein the input/output signal conversion processing unit includes an interpolation unit that performs an interpolation process using data defined by a look-up table.

15. The signal conversion apparatus according to claim 13, further comprising:
  a weight determination unit that performs the interpolation process using data defined by the weight definition information to determine the value of the weight.

16. A print system comprising:
  the signal conversion apparatus according to claim 13; and
  a printing device that forms an image on a recording medium on the basis of an output vector generated by the signal conversion apparatus.

17. The print system according to claim 16, wherein the printing device uses an aqueous ultraviolet curable ink as the color material.

18. A recording medium storing non-transitory program that causes a computer to implement:

a signal conversion function that converts an image signal in order to limit a total amount of color materials used in a printing device which forms an image on a recording medium using a plurality of color materials;

a plurality of input/output signal conversion processing functions that perform an input/output signal conversion process on the basis of different limit values such that a plurality of results of conversion from an input vector to a vector in which the total amount of color materials used is limited to a value equal to or less than the limit value are generated;

a function that determines a final output vector after the total amount of color materials used is limited for the input vector, on the basis of the plurality of input/output signal conversion processing functions and weight definition information in which weights applied to the conversion results of the plurality of input/output signal conversion processing units are determined according to the input vector;

a function that applies the plurality of input/output signal conversion processing functions to the input vector to generate a plurality of output vectors for each limit value in which the total amount of color materials used is limited to a value that is equal to or less than each limit value from each input/output signal conversion process; and a weighted sum calculation function that calculates a weighted sum of the plurality of output vectors for each limit value, on the basis of the weight definition information, wherein the signal conversion function outputs a converted image signal based on the final output vector, the converted image signal being usable, by the printing device, to form the image on the recording medium.

* * * * *